US012177114B2

United States Patent
Kunjidhapatham et al.

(10) Patent No.: US 12,177,114 B2
(45) Date of Patent: Dec. 24, 2024

(54) HARDWARE-ASSISTED DIGITAL FAULT RELAY FOR SUB-50MS OPTICAL PROTECTION

(71) Applicant: Infinera Corp., San Jose, CA (US)

(72) Inventors: Ashok Kunjidhapatham, Devarachikkanahalli (IN); Rajan Rao, Fremont, CA (US); Kapil Juneja, Karnataka (IN)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 18/461,259

(22) Filed: Sep. 5, 2023

(65) Prior Publication Data

US 2024/0080260 A1     Mar. 7, 2024

Related U.S. Application Data

(60) Provisional application No. 63/403,614, filed on Sep. 2, 2022.

(51) Int. Cl.
| | |
|---|---|
| *G06F 15/16* | (2006.01) |
| *H04L 45/00* | (2022.01) |
| *H04L 45/28* | (2022.01) |
| *H04Q 11/00* | (2006.01) |

(52) U.S. Cl.
CPC ............ *H04L 45/28* (2013.01); *H04L 45/566* (2013.01); *H04Q 11/0062* (2013.01)

(58) Field of Classification Search
CPC .... H04L 45/28; H04L 45/566; H04Q 11/0062

USPC .......................................................... 709/238
See application file for complete search history.

(56) References Cited

U.S. PATENT DOCUMENTS

| | | | | |
|---|---|---|---|---|
| 7,346,015 | B2* | 3/2008 | Shipman | H04L 45/26 370/310 |
| 7,359,358 | B2* | 4/2008 | Shipman | H04L 45/42 370/347 |
| 7,606,237 | B2* | 10/2009 | Dziong | H04L 47/724 370/242 |
| 7,821,922 | B1* | 10/2010 | Walton | H04L 45/28 370/395.31 |
| 8,798,084 | B2* | 8/2014 | Pratt, Jr. | G01D 21/00 370/406 |
| 9,369,360 | B1* | 6/2016 | Segalov | H04L 41/046 |

(Continued)

*Primary Examiner* — Moustafa M Meky

(57) ABSTRACT

Optical networks and nodes are described herein, including an optical network comprising a head-end node and a tail-end node. A line module of the head-end node receives fault information, generates a fault packet, and sends the fault packet to a first node controller identified by first packet forwarding information included in a packet header of the fault packet. The first node controller retrieves second packet forwarding information using the first packet forwarding information, updates the packet header, and sends the fault packet to the tail-end node identified by the second packet forwarding information. A second node controller of the tail-end node retrieves third packet forwarding information using the second packet forwarding information, updates the packet header, and sends the fault packet to an optical protection switching module (OPSM) of the tail-end node identified by the second packet forwarding information. The OPSM switches an optical switch based on the fault information.

20 Claims, 8 Drawing Sheets

(56) References Cited

U.S. PATENT DOCUMENTS

| | | | | |
|---|---|---|---|---|
| 9,819,499 | B2* | 11/2017 | McCallen | H04L 12/10 |
| 11,974,208 | B2* | 4/2024 | Tang | H04L 61/00 |
| 11,994,940 | B2* | 5/2024 | Liu | G06F 11/0772 |
| 2004/0185889 | A1* | 9/2004 | Shipman | H04L 45/26 |
| | | | | 455/517 |
| 2004/0193724 | A1* | 9/2004 | Dziong | H04L 47/825 |
| | | | | 709/232 |
| 2004/0218528 | A1* | 11/2004 | Shipman | H04L 45/42 |
| | | | | 370/232 |
| 2009/0040922 | A1* | 2/2009 | Umansky | H04J 14/0241 |
| | | | | 370/224 |
| 2020/0344664 | A1* | 10/2020 | Tang | H04L 12/4604 |
| 2021/0349777 | A1* | 11/2021 | Liu | G06F 11/0745 |

* cited by examiner

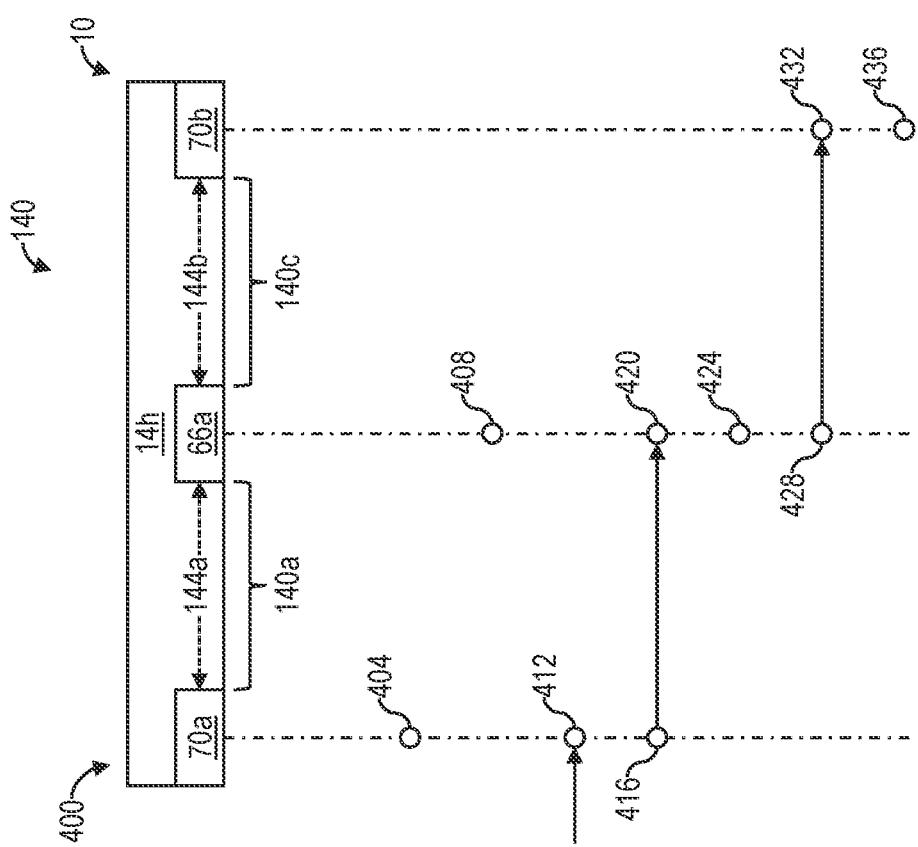

HARDWARE-ASSISTED DIGITAL FAULT RELAY FOR SUB-50MS OPTICAL PROTECTION

CROSS-REFERENCE TO RELATED APPLICATIONS

This application claims priority to the provisional patent application identified by U.S. Ser. No. 63/403,614, filed Sep. 2, 2022, the entire content of which is hereby expressly incorporated herein by reference.

BACKGROUND ART

Optical networking is a communication means that utilizes signals encoded in light to transmit information (e.g., data) as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, transcontinental communication.

Optical networks are a critical component of the global Internet backbone. This infrastructure acts as the underlay, providing the plumbing for all other communications to take place (e.g., access, metro, and long-haul). In the traditional 7-layer OSI model, optical networks constitute the Layer 1 (also referred to as the "digital layer") functions, providing digital transmission of bit streams transparently across varying distances over a chosen physical media (in this case, optical). Optical networks also encompass an entire class of devices (which are referred to as "Layer 0" or the "optical layer"), which purely deal with optical photonic transmission and wavelength division multiplexing (WDM). This includes amplification, (re-)generation and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Optical networks may experience a failure between a transmitting node (i.e., an upstream node or head-end node) and a receiving node (i.e., a downstream node or tail-end node). Traditionally, optical networks, such as integrated coherent DWDM networks, handling these failures may implement protection schemes at either Layer 0 or Layer 1, which, when activated, causes the optical signal to be transmitted on a protection path between the head-end node and the tail-end node, instead of on a working path between the same nodes (referred to hereinafter as "1+1 optical protection switching").

However, in certain optical configurations, 1+1 optical protection switching based solely on fault monitoring at Layer 0 is insufficient. Fault monitoring at Layer 1 is desired in order to reliably perform the 1+1 optical protection switching at Layer 0.

SUMMARY OF THE INVENTION

A method and system are disclosed. In one aspect, the problem of implementing 1+1 optical protection switching based on fault monitoring at Layer 1 is addressed through a head-end node, comprising: a node controller; and a line module comprising a processor and a non-transitory processor-readable medium storing processor-executable instructions that when executed by the processor cause the processor to: receive fault information related to a fault; generate a fault packet comprising a packet header and the fault information, the packet header including first packet forwarding information identifying the node controller as a first destination; and send the fault packet to the node controller identified by the first packet forwarding information; and wherein the node controller comprises packet forwarding circuitry configured to: retrieve second packet forwarding information from a table using at least a portion of the first packet forwarding information as a key, the second packet forwarding information identifying a tail-end node as a second destination; update the packet header of the fault packet with the second packet forwarding information; and send the fault packet toward the tail-end node identified by the second packet forwarding information.

In another aspect, the problem of implementing 1+1 optical protection switching based on fault monitoring at Layer 1 is addressed through a tail-end node, comprising: an optical protection switching module comprising a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and a node controller comprising packet forwarding circuitry configured to: receive a fault packet comprising a packet header and fault information related to a fault, the packet header including first packet forwarding information identifying the tail-end node as a first destination; retrieve second packet forwarding information from a table using at least a portion of the first packet forwarding information as a key, the second packet forwarding information identifying the optical protection switching module as a second destination; update the packet header of the fault packet with the second packet forwarding information; and send the fault packet to the optical protection switching module identified by the second packet forwarding information; and wherein the optical protection switching module further comprises a processor and a non-transitory processor-readable medium storing processor-executable instructions that when executed by the processor cause the processor to switch the optical switch based on the fault information.

In yet another aspect, the problem of implementing 1+1 optical protection switching based on fault monitoring at Layer 1 is addressed through an optical network, comprising: a tail-end node; and a head-end node, comprising: a first node controller; and a line module comprising a first processor and a first non-transitory processor-readable medium storing first processor-executable instructions that when executed by the first processor cause the first processor to: receive fault information related to a fault; generate a fault packet comprising a packet header and the fault information, the packet header including first packet forwarding information identifying the first node controller as a first destination; and send the fault packet to the first node controller identified by the first packet forwarding information; and wherein the first node controller comprises first packet forwarding circuitry configured to: retrieve second packet forwarding information from a first table using at least a portion of the first packet forwarding information as a first key, the second packet forwarding information identifying the tail-end node as a second destination; update the packet header of the fault packet with the second packet forwarding information; and send the fault packet toward the tail-end node identified by the second packet forwarding information; and wherein the tail-end node comprises: an optical protection switching module comprising a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and a second node controller comprising second packet forwarding circuitry configured to: retrieve third packet forwarding information from a second table using at least a portion of the second packet forwarding information as a second key, the third packet forwarding information identifying the optical protection switching module as a third destination; update the packet header of the fault packet with the third packet forwarding information; and send the fault packet to the optical protection switching module identified by the third packet forwarding information; and wherein the optical protection switching module further comprises a second processor and a second non-transitory processor-readable medium storing processor-executable instructions that when executed by the second processor cause the second processor to switch the optical switch based on the fault information.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 6A is a diagrammatic view of an exemplary implementation of a fault packet constructed in accordance with the present disclosure;

FIG. 6B is a diagrammatic view of an exemplary implementation of a SHIM header for use in the fault packet shown in FIG. 6A;

FIG. 6C is a diagrammatic view of an exemplary implementation of an IPv4 header for use in the fault packet shown in FIG. 6A;

FIG. 6D is a diagrammatic view of an exemplary implementation of an IPv6 header for use in the fault packet shown in FIG. 6A;

FIG. 7B is a process flow diagram of an exemplary method of performing a hardware-assisted digital fault relay in the optical network shown in FIG. 5B in accordance with one implementation with the present disclosure.

DETAILED DESCRIPTION

Figure 1:
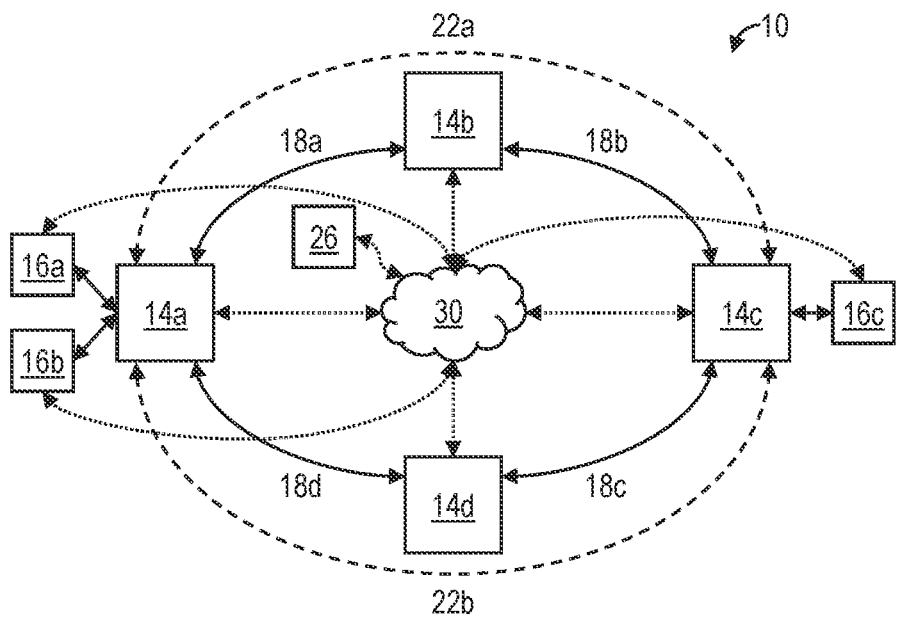
FIG. 1 is a diagrammatic view of an exemplary implementation of an optical network constructed in accordance with the present disclosure.

The following detailed description refers to the accompanying drawings. The same reference numbers in different drawings may identify the same or similar elements.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, a digital fault or fault signal is a fault condition that is reported and may be determined after coherent detection in an optical transponder (e.g., Line card). The fault condition may include one or more of the following: Loss of Frame (LOS), based on one or more of an Out of Frame (OOF) defect, an Out of Multi-frame (OOM) defect, or a Loss of Multi-frame (LOM) defect; a Backward Defect Indication (BDI) fault, a Remote BDI (RBDI) fault, a Backward signal degrade (BSD) fault, an Alarm Indication Signal (AIS), an Open Connection Indication (OCI), and/or a remote BSD (RBSD) fault. A BDI is an indication sent upstream by a downstream node detecting LOF. This information may be carried in an SDFEC overhead.

In accordance with the present disclosure, a hardware-assisted fast relay of Layer 1 fault information from the source (i.e., the optical node where the optical link in which the fault was detected is sourced) to the destination (i.e., the optical node where the optical link in which the fault was detected is terminated) is herein described. Switching the optical signal from the working path to the protection path is preferably performed within 50 milliseconds (ms). This 50 ms switching time generally includes: (i) fault detection at the source; (ii) propagation of fault information from the source to the destination; (iii) protection switching at the destination; and (iv) signal recovery at the source. For this reason, propagation of fault information from the source to the destination is preferably performed within 10 ms.

One challenge presented by minimizing the propagation time of the fault information is that the fault information is passed between three separate communication domains or segments: (i) a source line module to a source node controller; (ii) the source node controller to a destination node controller; and (iii) the destination node controller to a destination optical protection switching module (OPSM). Where the fault source and the fault destination are housed in the same optical node, communication segment (ii) may be not applicable.

In the prior art, software-based forwarding is typically used in inter-domain packet forwarding scenarios. However, propagating the fault information within 10 ms is difficult to achieve with only software-based forwarding, especially where the source and the destination are hosted within separate optical nodes, due to queuing and thread priority or contention for each transmission of the fault information from one entity to another.

To accommodate the propagation across the communication segments, an emulated communication network, such as a virtual local area network (VLAN), is instantiated for a given flow from the source to the destination using packet forwarding information, such as a flow identifier (Flow ID), contained within packet headers of fault packets containing the fault information. The fault packets may be forwarded across the nodes of the optical network using conventional IP routing functions. Circuitry, such as a field-programmable gate array (FPGA), on a node controller may extract the Flow ID from an incoming fault packet, retrieve a new Flow ID from a lookup table, and modify the packet header of an outgoing fault packet to include the new Flow ID for routing the fault packet over the next communication segment. Thus, software-based forwarding may be avoided in the propagation of the fault packet.

Referring now to FIG. 1, shown therein is a diagrammatic view of an exemplary implementation of an optical network 10 constructed in accordance with the present disclosure. The optical network 10 may include a plurality of optical nodes 14a-n (hereinafter the "optical nodes 14"). In the implementation shown, the optical network 10 includes four optical nodes 14a-d, including a first optical node 14a, a second optical node 14b, a third optical node 14c, and a fourth optical node 14d; however, in other implementations, the optical network 10 may include more or less than four optical nodes 14a-d.

The optical network 10 may include any type of network that uses light as a transmission medium. For example, the optical network 10 may include a fiber-optic based network, an optical transport network, a light-emitting diode network, a laser diode network, an infrared network, a wireless optical network, a wireless network, combinations thereof, and/or other types of optical networks.

Particular ones of the optical nodes 14 may be denoted as terminal nodes for an optical signal being transmitted within the optical network 10. Each of the terminal nodes may either transmit or receive the optical signal being transmitted within the optical network 10. The terminal nodes may include a head-end node (also referred to as a "source node") and a tail-end node (also referred to as a "destination node"). In the implementation shown, the first optical node 14a (hereinafter the "head-end node 14a") is functioning as a head-end node and the third optical node 14c (hereinafter the "tail-end node 14c") is functioning as a tail-end node (the head-end node 14a and the tail-end node 14c, collectively the "terminal nodes 14a, 14c").

As shown in FIG. 1, one or more of the terminal nodes 14a, 14c may be connected to one or more transponder node 16 (hereinafter the "transponder nodes 16"), shown in FIG. 1 as a first transponder node 16a and a second transponder node 16b connected to the head-end node 14a and a third transponder node 16c connected to the tail-end node 14c. The transponder nodes 16 may provide optical signals to the optical nodes 14 to which the transponder nodes 16 are connected.

Other ones of the optical nodes 14 between the terminal nodes 14a, 14c may be denoted as intermediate nodes. In the implementation shown, the second optical node 14b (hereinafter the "first intermediate node 14b") and the fourth optical node 14d (hereinafter the "second intermediate node 14d") are functioning as intermediate nodes (the first intermediate node 14b and the second intermediate node 14d, collectively the "intermediate nodes 14b, 14d").

Each of the optical nodes 14 may be implemented in a variety of ways, non-exclusive examples of which including optical line terminals (OLTs), optical cross connects (OXCs), optical line amplifiers (OAs), optical add/drop multiplexer (OADMs) and/or reconfigurable optical add/drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes 14 are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803, titled "Programmable Time Division Multiplexed Switching," the entire contents of each of which are hereby incorporated herein by reference in its entirety.

Each of the optical nodes 14 may be connected to each other by optical links 18 (hereinafter the "optical links 18a-n"). Each of the optical links 18 may be a fiber optic cable and may be uninterrupted (i.e., having no break in the fiber optic cable) or may have one or more optical node 14 disposed thereon and positioned in between each of the optical nodes 14. In the implementation shown, the optical network 10 includes four optical links 18a-d, including a first optical link 18a between the head-end node 14a and the first intermediate node 14b, a second optical link 18b between the first intermediate node 14b and the tail-end node 14c, a third optical link 18c between the second intermediate node 14d and the tail-end node 14c, and a fourth optical link 18d between the head-end node 14a and the second intermediate node 14d; however, in other implementations, the optical network 10 may include more or less than four optical links 18a-d.

An optical signal being transmitted within the optical network 10 from the head-end node 14a to the tail-end node 14c may traverse one or more paths through the optical network 10, shown in FIG. 1 as a working path 22a and a protection path 22b. The working path 22a may be formed between the head-end node 14a and the tail-end node 14c through the first intermediate node 14b and includes the first optical link 18a and the second optical link 18b as components thereof. The protection path 22b may be formed between the head-end node 14a and the tail-end node 14c through the second intermediate node 14d and includes the third optical link 18c and the fourth optical link 18d as components thereof.

While the working path 22a and the protection path 22b are described as traversable by an optical signal being transmitted from the head-end node 14a to the tail-end node 14c, each of the working path 22a and the protection path 22b may be bidirectional; that is, each of the working path 22a and the protection path 22b may be traversable by an optical signal being transmitted from the tail-end node 14c to the head-end node 14a.

The working path 22a may be described as a default path for the optical signal to traverse; that is, the working path 22a may be a data path configured to carry data traffic while there is no failure or fault signal on the working path 22a. The protection path 22b may be described as a backup path for the optical signal to traverse if the optical signal is unable to traverse the working path 22a; that is, the protection path 22b may be a data path configured to carry data traffic while there is a failure or fault signal on the working path 22a.

If there is a failure or fault signal on the working path 22a, then the working path 22a may be said to have failed. As described further below, if the working path 22a is failed, then data traffic may be directed from the working path 22a to the protection path 22b. If the failure or fault signal is resolved, then the working path 22a may be said to have recovered from failure. The working path 22a may be revertive or non-revertive. Revertive means that data traffic is directed from the protection path 22b to the working path 22a after the working path 22a recovers from failure, while non-revertive means that data traffic is not directed from the protection path 22b to the working path 22a after the working path 22a recovers from failure.

In some implementations, a user may interact with a computer system 26 (e.g., via a user device (not shown)) that may be used to communicate with one or more of the optical nodes 14 and the transponder nodes 16 via a communication network 30. Each element of the computer system 26 may be partially or completely network-based or cloud-based and may or may not be located in a single physical location. In some implementations, the communication network 30 is a Layer 3 communication network.

As further described below, in some implementations, the computer system 26 may comprise a processor 42 and a memory 50 having a data store 58 that may store data such as network element version information, firmware version information, sensor data, system data, metrics, logs, tracing, and the like in a raw format as well as transformed data that may be used for tasks such as reporting, visualization, analytics, signal routing, power loading operations and/or coordination, etc. The data store 58 may include structured data from relational databases, semi-structured data, unstructured data, time-series data, and binary data. The data store 58 may be a database, a remote accessible storage, or a distributed filesystem. In some implementations, the data store 58 may be a component of an enterprise network.

In some implementations, the computer system 26 is connected to one or more of the optical nodes 14 and the transponder nodes 16 via the communication network 30. In this way, the computer system 26 may communicate with the optical nodes 14 and the transponder nodes 16 and may, via the communication network 30, transmit to or receive data from the optical nodes 14 and the transponder nodes 16. In other implementations, the computer system 26 may be integrated into each of the optical nodes 14 and the transponder nodes 16 and/or may communicate with one or more pluggable card within the optical nodes 14 and the transponder nodes 16. In some implementations, the computer system 26 may be a remote network element.

The communication network 30 may permit bi-directional communication of information and/or data between the computer system 26, the optical nodes 14, and/or the transponder nodes 16. The communication network 30 may interface with the computer system 26, the optical nodes 14, and/or the transponder nodes 16 in a variety of ways. For example, in some implementations, the communication network 30 may interface by optical and/or electronic interfaces, and/or may use a plurality of network topographies and/or protocols including, but not limited to, Ethernet, TCP/IP, circuit switched path, combinations thereof, and/or the like. The communication network 30 may utilize a variety of network protocols to permit bi-directional interface and/or communication of data and/or information between the computer system 26, the optical nodes 14, and/or the transponder nodes 16.

The communication network 30 may be almost any type of network. For example, in some implementations, the communication network 30 may be a version of an Internet network (e.g., exist in a TCP/IP-based network). In one implementation, the communication network 30 is the Internet. It should be noted, however, that the communication network 30 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication network 30 is the Internet, a primary user interface of the computer system 26 may be delivered through a series of web pages or private internal web pages of a company or corporation, which may be written in hypertext markup language, JavaScript, or the like, and accessible by the user. It should be noted that the primary user interface of the computer system 26 may be another type of interface including, but not limited to, a Windows-based application, a tablet-based application, a mobile web interface, a VR-based application, an application running on a mobile device, and/or the like. In one implementation, the communication network 30 may be connected to the user device (not shown), the computer system 26, the optical nodes 14, and the transponder nodes 16.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the optical network 10 may perform one or more functions described as being performed by another one or more of the devices of the optical network 10. Devices of the computer system 26 may interconnect via wired connections, wireless connections, or a combination thereof. For example, in one embodiment, the user device and the computer system 26 may be integrated into the same device; that is, the user device may perform functions and/or processes described as being performed by the computer system 26, described below in more detail.

Figure 2:
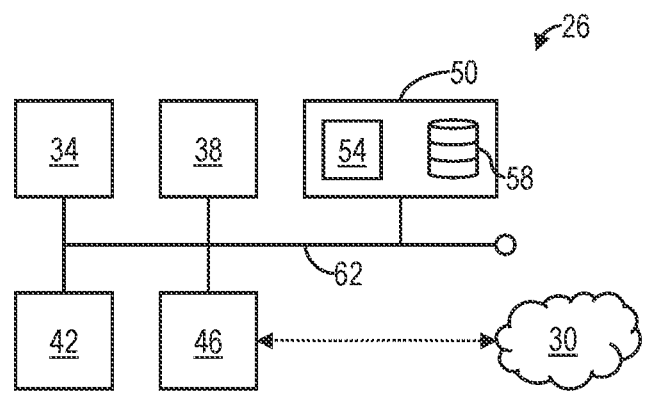
FIG. 2 is a diagrammatic view of an exemplary implementation of a user device for use in the optical network shown in FIG. 1.

Referring now to FIG. 2, shown therein is a diagrammatic view of an exemplary implementation of a computer system 26 constructed in accordance with the present disclosure. In some implementations, the computer system 26 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

The computer system 26 may include one or more input device 34 (hereinafter the "input device 34"), one or more output device 38 (hereinafter the "output device 38"), one or more processor 42 (hereinafter the "processor 42"), one or more communication device 46 (hereinafter the "communication device 46") capable of interfacing with the communication network 30, one or more non-transitory processor-readable medium 50 (hereinafter the "memory 50") storing processor-executable code and/or one or more software application 54 including, for example, a web browser capable of accessing a website and/or communicating information and/or data over a wireless or wired network (e.g., the communication network 30) and/or the like, and a data store 58. The input device 34, the output device 38, the processor 42, the communication device 46, and the memory 50 may be connected via a path 62 such as a data bus that permits communication among the components of the computer system 26.

The input device 34 may be capable of receiving information input from the user, another computer, and/or the processor 42, and transmitting such information to other components of the computer system 26 and/or the communication network 30. The input device 34 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 38 may be capable of outputting information in a form perceivable by the user, another computer system, and/or the processor 42. For example, implementations of the output device 38 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary embodiments, the input device 34 and the output device 38 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

In some implementations, the processor 42 may comprise one or more processor 42 working together, or independently, to read and/or execute processor executable code and/or data, such as stored in the memory 50. The processor 42 may be capable of creating, manipulating, retrieving, altering, and/or storing data structures into the memory 50. Each element of the computer system 26 may be partially or completely network-based or cloud-based, and may or may not be located in a single physical location.

Exemplary implementations of the processor 42 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 42 may be capable of communicating with the memory 50 via the path 62 (e.g., data bus). The processor 42 may be capable of communicating with the input device 34 and/or the output device 38.

The processor 42 may be further capable of interfacing and/or communicating with the optical nodes 14 and the transponder nodes 16 via the communication network 30 using the communication device 46. For example, the processor 42 may be capable of communicating via the communication network 30 by exchanging signals (e.g., analog, digital, optical, and/or the like) via one or more ports (e.g., physical or virtual ports) using a network protocol (e.g., TCP/IP) to provide information to the optical network 10 (i.e., the optical nodes 14 and the transponder nodes 16) and receive information from the optical network 10 (i.e., the optical nodes 14 and the transponder nodes 16).

The memory 50 may store a software application 54 that, when executed by the processor 42, causes the computer system 26 to perform an action such as communicate with, or control, one or more component of the computer system 26, the optical network 10 (e.g., the optical nodes 14 and the transponder nodes 16), and/or the communication network 30.

In some implementations, the memory 50 may be located in the same physical location as the computer system 26, and/or one or more memory 50 may be located remotely from the computer system 26. For example, the memory 50 may be located remotely from the computer system 26 and communicate with the processor 42 via the communication network 30. Additionally, when more than one memory 50 is used, a first memory may be located in the same physical location as the processor 42, and additional memory may be located in a location physically remote from the processor 42. Additionally, the memory 50 may be implemented as a "cloud" non-transitory processor-readable storage memory (i.e., one or more of the memory 50 may be partially or completely based on or accessed using the communication network 30).

In some implementations, the data store 58 may be a time-series database, a vector database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 58 may be centralized or distributed across multiple systems.

Figure 3A:
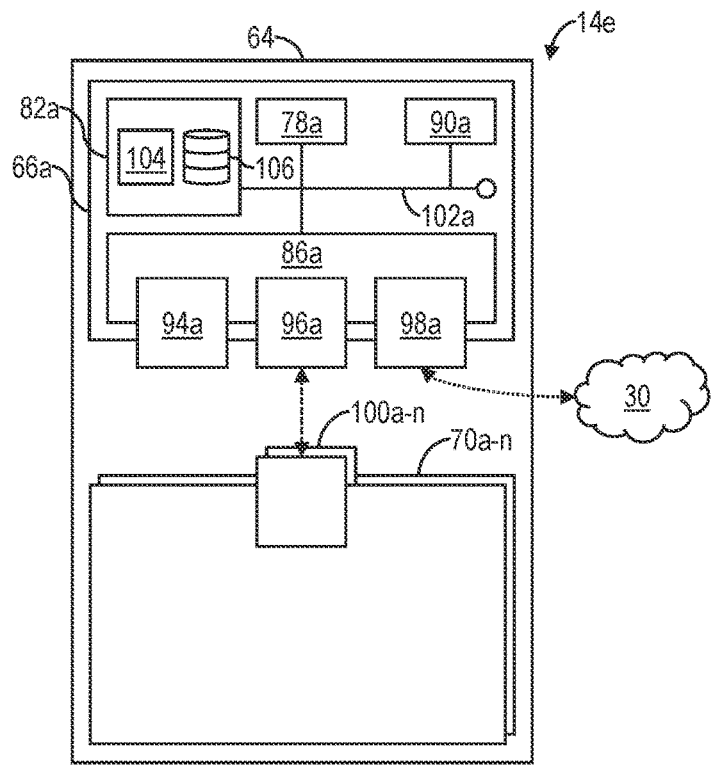
FIG. 3A is a diagrammatic view of an exemplary implementation of a terminal node comprising a chassis containing a node controller and one or more field replaceable unit (FRU) for use in the optical network shown in FIG. 1.
Figure 3B:
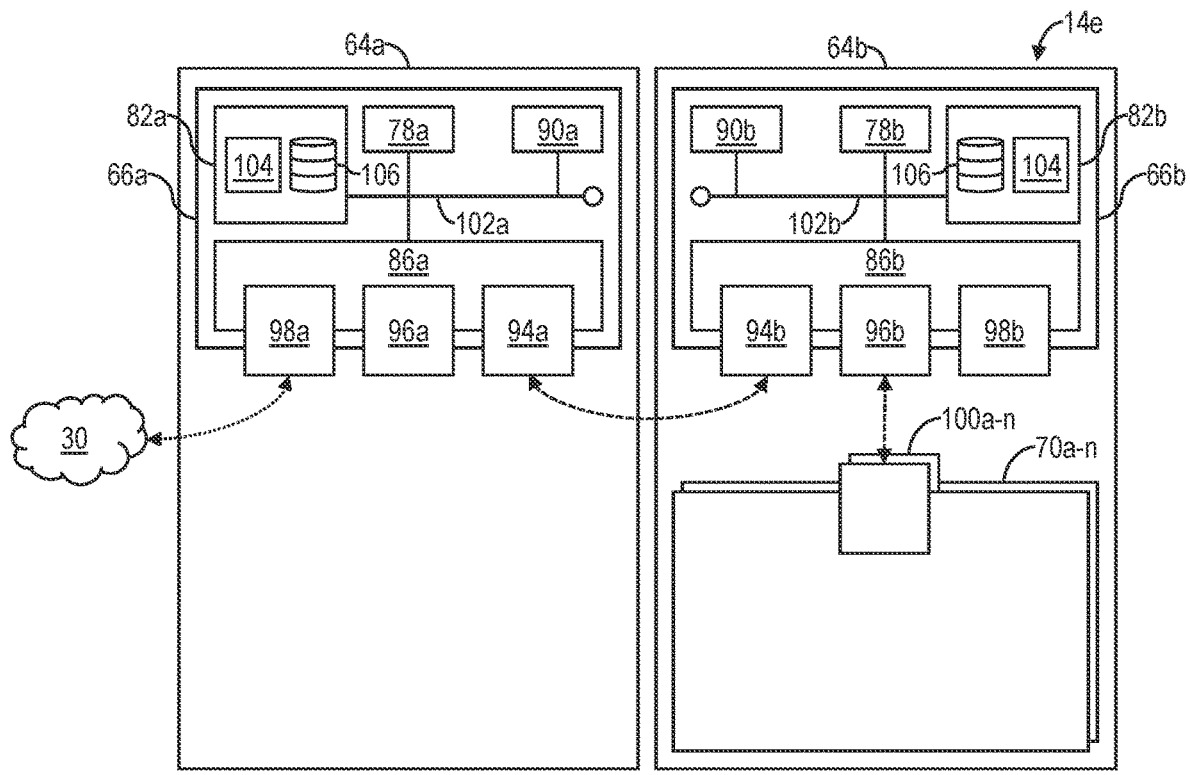
FIG. 3B is a diagrammatic view of an exemplary implementation of a terminal node comprising a first chassis containing a node controller and a second chassis containing a shelf controller and one or more FRU for use in the optical network shown in FIG. 1.

Referring now to FIGS. 3A-3B, shown therein are diagrammatic views of exemplary implementations of a terminal node 14e constructed in accordance with the present disclosure. The terminal node 14e may be an implementation of one of the terminal nodes 14a, 14c or the transponder nodes 16. The terminal node 14e generally comprises one or more chassis 64, such as chassis 64 shown in FIG. 3A or a first chassis 64a and a second chassis 64b shown in FIG. 3B, containing one or more controller, such as a node controller 66a shown in FIGS. 3A and 3B and a shelf controller 66b shown in FIG. 3B, for example, and one or more field-replaceable unit (FRU) 70a-n (hereinafter the "FRUs 70"), such as a line module 70a (shown in FIG. 4A) and an OPSM 70b (shown in FIG. 4B), for example.

As shown in FIGS. 3A-3B, the node controller 66a may comprise one or more processor 78a (hereinafter the "node controller processor 78a"), one or more non-transitory processor-readable medium 82a (hereinafter the "node controller memory 82a"), a network switch 86a (hereinafter the "node controller network switch 86a"), and packet forwarding circuitry, shown in FIGS. 3A-3B as field-programmable gate array 90a (hereinafter the "node controller FPGA 90a"). While the node controller processor 78a is shown as being separate from the node controller FPGA 90a, in some implementations, the node controller processor 78a may be integrated into the node controller FPGA 90a. The node controller processor 78a, the node controller memory 82a, the network switch 86a, and the node controller FPGA 90a may be connected via a path 102a such as a data bus that permits communication among the components of the node controller 66a.

The network switch 86a may comprise one or more of a first interface, shown as Nodal Control and Timing (NCT) interface 94a (hereinafter the "node controller NCT interface 94a"), a second interface, shown as FRU interface 96a (hereinafter the "node controller FRU interface 96a") and a third interface, shown as auxiliary (AUX) interface 98a (hereinafter the "node controller AUX interface 98a").

As further shown in FIG. 3B, the shelf controller 66b may comprise one or more processor 78b (hereinafter the "shelf controller processor 78b") (the node controller processor 78a and the shelf controller processor 78b, collectively the "controller processors 78"), one or more non-transitory processor-readable medium 82b (hereinafter the "shelf controller memory 82b") (the node controller memory 82a and the shelf controller memory 82b, collectively the "controller memories 82"), a network switch 86b (hereinafter the "shelf controller network switch 86b") (the node controller network switch 86a and the shelf controller network switch 86b, collectively the "controller network switches 86"), and packet forwarding circuitry, shown in FIG. 3B as field-programmable gate array 90b (hereinafter the "shelf controller FPGA 90b") (the node controller FPGA 90a and the shelf controller FPGA 90b, collectively the "controller FPGAs 90"). While the shelf controller processor 78b is shown as being separate from the shelf controller FPGA 90b, in some implementations, the shelf controller processor 78b may be integrated into the shelf controller FPGA 90b. The shelf controller processor 78b, the shelf controller memory 82b, the shelf controller network switch 86b, and the shelf controller FPGA 90b may be connected via a path 102b such as a data bus that permits communication among the components of the shelf controller 66b.

The shelf controller network switch 86b may comprise one or more of a first interface, shown as NCT interface 94b (hereinafter the "shelf controller NCT interface 94b") (the node controller NCT interface 94a and the shelf controller NCT interface 94b, collectively the "NCT interfaces 94"), a second interface, shown as FRU interface 96b (hereinafter the "shelf controller FRU interface 96b") (the node controller FRU interface 96a and the shelf controller FRU interface 96b, collectively the "FRU interfaces 96"), and a third interface, shown as auxiliary (AUX) interface 98b (hereinafter the "shelf controller AUX interface 98b") (the node controller AUX interface 98a and the shelf controller AUX interface 98b, collectively the "AUX interfaces 98").

As described in further detail below, the controller network switches 86 may be configured to communicate using communication networks, such as the communication network 30 shown in FIG. 1, the first intra-node communication network 144a (shown in FIG. 5A), or the second intra-node communication network 144b (shown in FIG. 5A), via one or more of the NCT interfaces 94, the FRU interfaces 96, and the AUX interfaces 98. In some implementations, the controller network switches 86 may be Layer 2/Layer 3 network switches.

As shown in FIG. 3B, the NCT interfaces 94 may be configured to communicate with the NCT interfaces 94 of other controller modules 66, such as when the terminal node 14e is provided with both the node controller 66a and the shelf controller 66b. Further, where the terminal node 14e is provided with more than one shelf controller 66b, the shelf controller NCT interface 94b of a first shelf controller 66b may communicate with the node controller NCT interface 94a of the node controller 66a and/or the shelf controller NCT interface 94b of a second shelf controller 66b, for example. As further shown in FIGS. 3A-3B, the FRU interfaces 96 may be configured to communicate with one or more controller module interface 100a-n, such as a line module controller module interface 100a (hereinafter the "line module CM interface 100a") (shown in FIG. 4A) and an OPSM controller module interface 100b (hereinafter the "OPSM CM interface 100b") (shown in FIG. 4B) (collectively the "CM interfaces 100"). As further shown in FIGS. 3A-3B, the AUX interfaces 98 may be configured to communicate with the AUX interfaces 98 of other optical nodes 14 and/or other transponder nodes 16 in the optical network 10 via the communication network 30.

One or more of the controller memories 82 may store processor-executable instructions and/or one or more software application 104 (hereinafter the "controller application 104") and a data store 106, for example. The controller application 104 when executed by the controller processors 78 may cause the controller processors 78 to perform one or more of the methods 300 (shown in FIG. 7A), 400 (shown in FIG. 7B) (or steps thereof) described herein.

In some implementations, the data store 106 may be a time-series database, a vector database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 106 may be centralized or distributed across multiple systems.

Figure 4A:
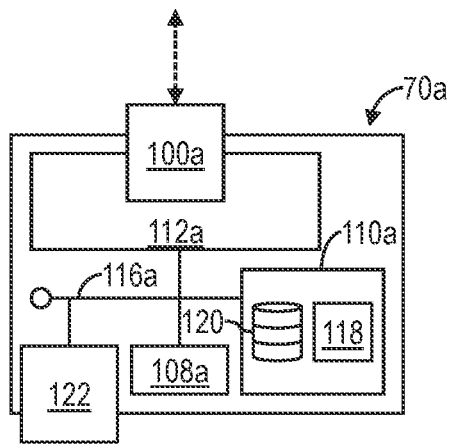
FIG. 4A is a diagrammatic view of an exemplary implementation of a line module for use in the terminal nodes shown in FIGS. 3A and 3B.

Referring now to FIG. 4A, shown therein is a diagrammatic view of an exemplary implementation of a line module 70a constructed in accordance with the present disclosure. As shown in FIG. 4A, the line module 70a may comprise one or more processor 108a (hereinafter the "line module processor 108a"), one or more non-transitory processor-readable medium 110a (hereinafter the "line module memory 110a"), and a network switch 112a (hereinafter the "line module network switch 112a"). The line module network switch 112a may comprise an interface, shown in FIG. 4A as the line module CM interface 100a. In some implementations, the line module network switch 112a is a Layer 2 network switch; in other implementations, the line module network switch 112a is a Layer 2/Layer 3 network switch.

As described in further detail below, the line module network switch 112a may be configured to communicate using communication networks, such as the first intra-node communication network 144a (shown in FIG. 5A) or the second intra-node communication network 144b (shown in FIG. 5A), via the line module CM interface 100a, for example. The line module processor 108a, the line module memory 110a, and the line module network switch 112a may be connected via a path 116a such as a data bus that permits communication among the components of the line module 70a.

The line module memory 110a may store processor-executable instructions and/or one or more software application 118 (hereinafter the "line module software application 118") and a data store 120, for example. The line module software application 118 when executed by the line module processor 108a may cause the line module processor 108a to perform one or more of the methods 300 (shown in FIG. 7A), 400 (shown in FIG. 7B) (or steps thereof) described herein.

In some implementations, the data store 120 may be a time-series database, a vector database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 120 may be centralized or distributed across multiple systems.

As further shown in FIG. 4A, the line module 70a may further comprise a coherent transceiver 122 which may include circuitry such as a coherent receiver, a coherent transmitter, combinations thereof, and/or the like. As described herein, the coherent transceiver 122 may be configured to detect a fault in one of the working path 22a and the protection path 22b and to send fault information 156 (shown in FIG. 6A) related to the fault to the line module processor 108a.

Figure 4B:
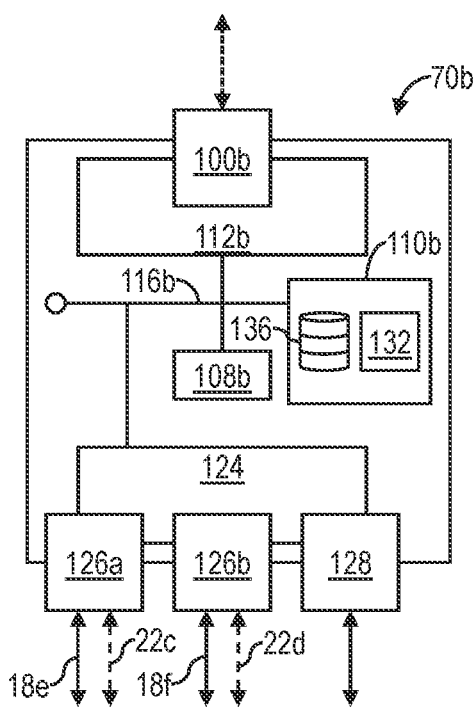
FIG. 4B is a diagrammatic view of an exemplary implementation of an optical protection switching module for use in the terminal nodes shown in FIGS. 3A and 3B.

Referring now to FIG. 4B, shown therein is a diagrammatic view of an exemplary implementation of an OPSM 70b constructed in accordance with the present disclosure. As shown in FIG. 4B, the OPSM 70b may comprise one or more processor 108b (hereinafter the "OPSM processor 108b") (the line module processor 108a and the OPSM processor 108b, collectively the "module processors 108"), one or more non-transitory processor-readable medium 110b (hereinafter the "OPSM memory 110b") (the line module memory 110a and the OPSM memory 110b, collectively the "module memories 110"), a network switch 112b (hereinafter the "OPSM network switch 112b") (the line module network switch 112a and the OPSM network switch 112b, collectively the "module network switches 112"), an optical switch 124, a first line port 126a (hereinafter the "working line port 126a"), a second line port 126b (hereinafter the "protection line port 126b"), and a system port 128.

The OPSM network switch 114b may comprise an interface, shown in FIG. 4B as the OPSM CM interface 100b. In some implementations, the OPSM network switch 114b is a Layer 2 network switch.

As described in further detail below, the OPSM network switch 112b may be configured to communicate using communication networks, such as the first intra-node communication network 144a (shown in FIG. 5A) or the second intra-node communication network 144b (shown in FIG. 5A), via the OPSM CM interface 100b, for example. The OPSM processor 108b, the OPSM memory 110b, the OPSM network switch 112b, and the optical switch 124 may be connected via a path 116b such as a data bus that permits communication among the components of the OPSM 70b.

The OPSM memory 110b may store processor-executable instructions and/or one or more software application 132 (hereinafter the "OPSM software application 132") and a data store 136, for example. The OPSM software application 132 when executed by the OPSM processor 108b may cause the OPSM processor 108b to perform one or more of the methods 300 (shown in FIG. 7A), 400 (shown in FIG. 7B) (or steps thereof) described herein.

In some implementations, the data store 136 may be a time-series database, a vector database, a relational database, or a non-relational database. Examples of such databases include DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The data store 136 may be centralized or distributed across multiple systems.

The working line port 126a may be in optical communication with a first optical link 18e, which may be a component of a working path 22c of the optical network 10, such that working line port 126a may transmit and receive first optical signals on the working path 22c. The protection line port 126b may be in optical communication with a second optical link 18f, which may be a component of a protection path 22d of the optical network 10, such that the protection line port 126b may transmit and receive second optical signals on the protection path 22d. The optical switch 124 may be coupled to the working line port 126a to transmit and receive the first optical signals from the working path 22c and the protection line port 126b to transmit and receive the second optical signals from the protection path 22d for selectively switching the optical signals (i.e., the first optical signals or the second optical signals) from the working line port 126a and the protection line port 126b to the system port 128.

In some implementations, one or more of the controller processors 78 and the module processors 108 may comprise one or more processor working together, or independently, to read and/or execute processor executable code and/or data, such as stored in the controller memories 82 and the module memories 110, respectively. The controller processors 78 and the module processors 108 may be capable of creating, manipulating, retrieving, altering, and/or storing data structures into the controller memories 82 and the module memories 110, respectively. Exemplary implementations of the controller processors 78 and the module processors 108 may include, but are not limited to, a digital signal processor (DSP), a central processing unit (CPU), an FPGA, a microprocessor, a multi-core processor, an application specific integrated circuit (ASIC), a real-time processing unit (RPU), combinations thereof, and/or the like, for example.

The controller processors 78 and the module processors 108 may be further capable of interfacing and/or communicating via the communication network 30, for example, using the controller network switches 86 and the module network switches 112, respectively. For example, the controller processors 78 and the module processors 108 may be capable of communicating via the communication network 30, for example, by exchanging signals (e.g., analog, digital, optical, and/or the like) via one or more interfaces (e.g., the AUX interfaces 98 or the controller interfaces 100) using a network protocol (e.g., TCP/IP) to communicate information.

In some implementations, the controller memories 82 and the module memories 110 may be located in the same physical location as the controller modules 66 and the FRUs 70, respectively, and/or one or more of the controller memories 82 and the module memories 110 may be located remotely from the controller modules 66 and the FRUs 70, respectively. For example, one or more of the controller memories 82 and the module memories 110 may be located remotely from the controller modules 66 and the FRUs 70, respectively, and communicate with the controller processors 78 and the module processors 108, respectively, via the first intra-node communication network 144a (shown in FIG. 5A) or the second intra-node communication network 144b (shown in FIG. 5A), for example. Additionally, when more than one memory is used for one or more of the controller memories 82 and the module memories 110, a first memory may be located in the same physical location as the controller processors 78 and the module processors 108, and additional memory may be located in a location physically remote from the controller processors 78 and the module processors 108. Additionally, one or more of the controller memories 82 and the module memories 110 may be implemented as a "cloud" non-transitory processor-readable medium (i.e., one or more of the controller memories 82 and the module memories 110 may be partially or completely based on or accessed using the first intra-node communication network 144a (shown in FIG. 5A) or the second intra-node communication network 144b (shown in FIG. 5A), for example).

Figure 5A:
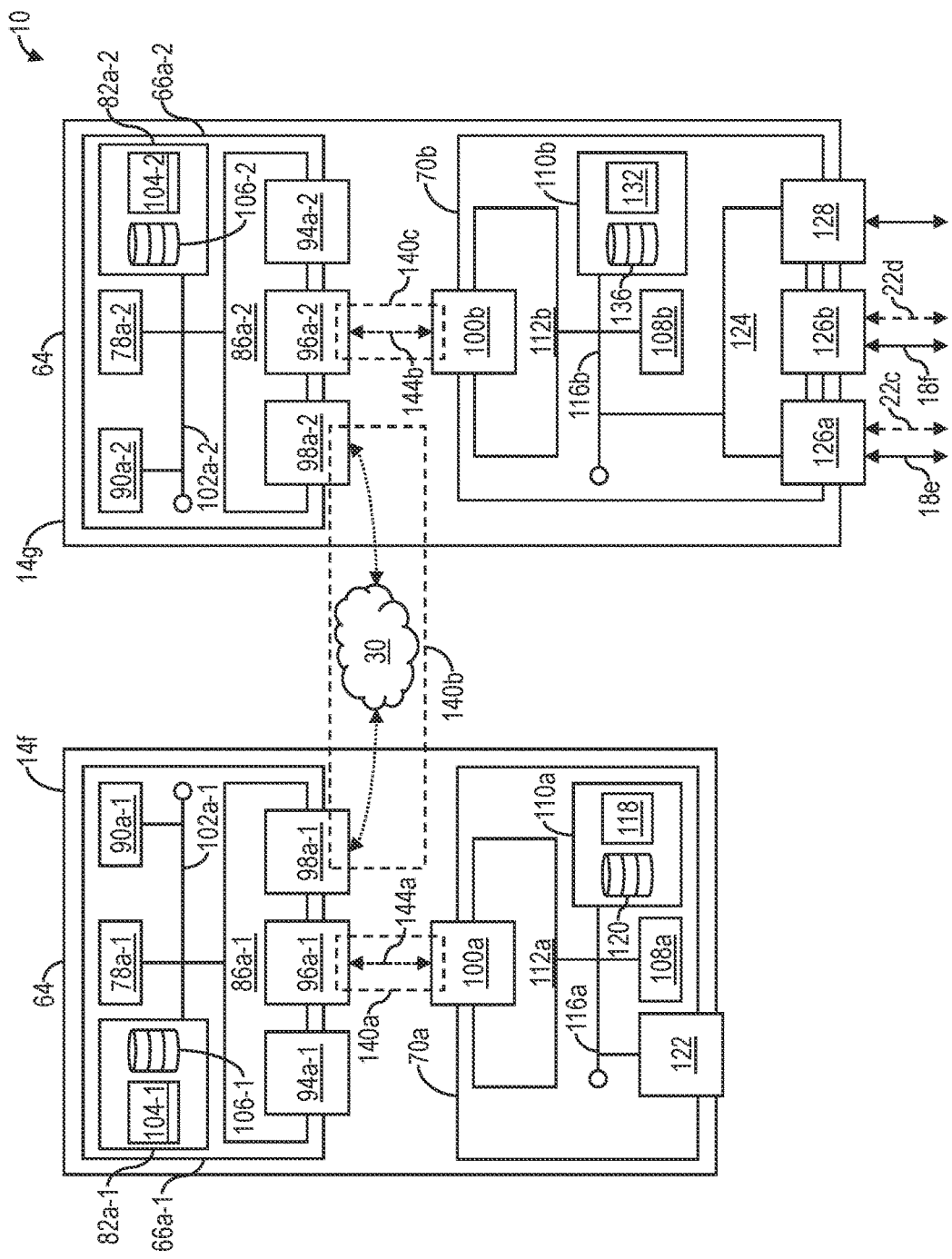
FIG. 5A is a diagrammatic view of another exemplary implementation of an optical network comprising a head-end node and a tail-end node constructed in accordance with the present disclosure.

Referring now to FIG. 5A, shown therein are a diagrammatic view of an exemplary implementation of the optical network 10 comprising a head-end node 14f and a tail-end node 14g. Each of the head-end node 14f and the tail-end node 14g may be an implementation of one of the terminal nodes 14a, 14c or the transponder nodes 16 shown in FIG. 1. The head-end node 14f is shown as comprising a first node controller 66a-1 and a line module 70a, while the tail-end node 14g is shown as comprising a second node controller 66a-2 and an OPSM 70b. However, one or more of the head-end node 14f and the tail-end node 14g may further comprise one or more shelf controller 66b, as described above. Further, the head-end node 14f may further comprise an additional OPSM 70b and the tail-end node 14g may further comprise an additional line module 70a. Finally, while only the head-end node 14f and the tail-end node 14g are shown, it should be understood that the optical network 10 may further comprise additional nodes 14 not shown in FIG. 5A.

The first node controller 66a-1 comprises a first node controller processor 78a-1, a first node controller memory 82a-1 storing a first controller application 104-1 and a first data store 106-1, a first node controller FPGA 90a-1, and a first network switch 86a-1 comprising a first node controller NCT interface 94a-1, a first node controller CM interface 96a-1, and a first node controller AUX interface 98a-1.

The second node controller 66a-2 comprises a second node controller processor 78a-2, a second node controller memory 82a-2 storing a second controller application 104-2 and a second data store 106-2, a second node controller FPGA 90a-2, and a second network switch 86a-2 comprising a second node controller NCT interface 94a-2, a second node controller CM interface 96a-2, and a second node controller AUX interface 98a-2.

As shown in FIG. 5A, a fast path 140 comprising a plurality of fast path segments 140a-n may be formed between the line module 70a of the head-end node 14f and the OPSM 70b of the tail-end node 14g. The fast path 140 is described herein using the elements of the optical network 10 shown in FIG. 5A; it should be noted, however, that the fast path 140 may be formed using other network elements.

The fast path 140 may extend from: (i) the line module 70a of the head-end node 14f to the first node controller 66a-1 of the head-end node 14f (via a first fast path segment 140a); (ii) the first node controller 66a-1 to the second node controller 66a-2 of the tail-end node 14g (via a second fast path segment 140b); and (iii) the second node controller 66a-2 to the OPSM 70b of the tail-end node 14g (via a third fast path segment 140c).

The fast path 140 may utilize hardware elements such as the first node controller FPGA 90a-1 and the second node controller FPGA 90a-2 to automatically forward packets through the optical network 10 from the source (i.e., the line module 70a in this implementation) to the destination (i.e., the OPSM 70b in this implementation) without using software-based forwarding techniques that are typically used in these types of inter-domain packet forwarding scenarios.

A plurality of flow identifiers (Flow IDs) 192 (shown in FIG. 6B) may be allocated for each of the fast path segments 140a-n. The Flow IDs 192 may be used by the first node controller FPGA 90a-1 and the second node controller FPGA 90a-2 to identify a particular fast path segment 140a-c and update a packet header 152 (shown in FIG. 6A) of a fault packet 148 (shown in FIG. 6A) accordingly. In some implementations, the Flow IDs 192 are 8 bits (i.e., 1 byte) in length. In other implementations, the Flow IDs 192 are 16 bits (i.e., 2 bytes) in length. However, it should be understood that the Flow IDs 192 may have a length other than 8 or 16 bits.

Each of the fast path segments 140a-n may utilize a separate communication network for the transmission of fault packets 148. For example, the second fast path segment 140*b* may utilize the communication network 30 shown in FIG. 1. Further, the first fast path segment 140*a* and the third fast path segment 140*c* may utilize a first intra-node communication network 144*a* and a second intra-node communication network 144*b*, respectively. In some implementations, the first intra-node communication network 144*a*, the communication network 30, and the second intra-node communication network 144*b* are a first virtual local area network (VLAN), a second VLAN, and a third VLAN, respectively. In such implementations, each of the VLANs may have a unique VLAN identifier. In some implementations, the first intra-node communication network 144*a* is a Layer 2 communication network. In other implementations, the first intra-node communication network 144*a* is a Layer 3 communication network. In some implementations, the second intra-node communication network 144*b* is a Layer 2 communication network.

Figure 5B:
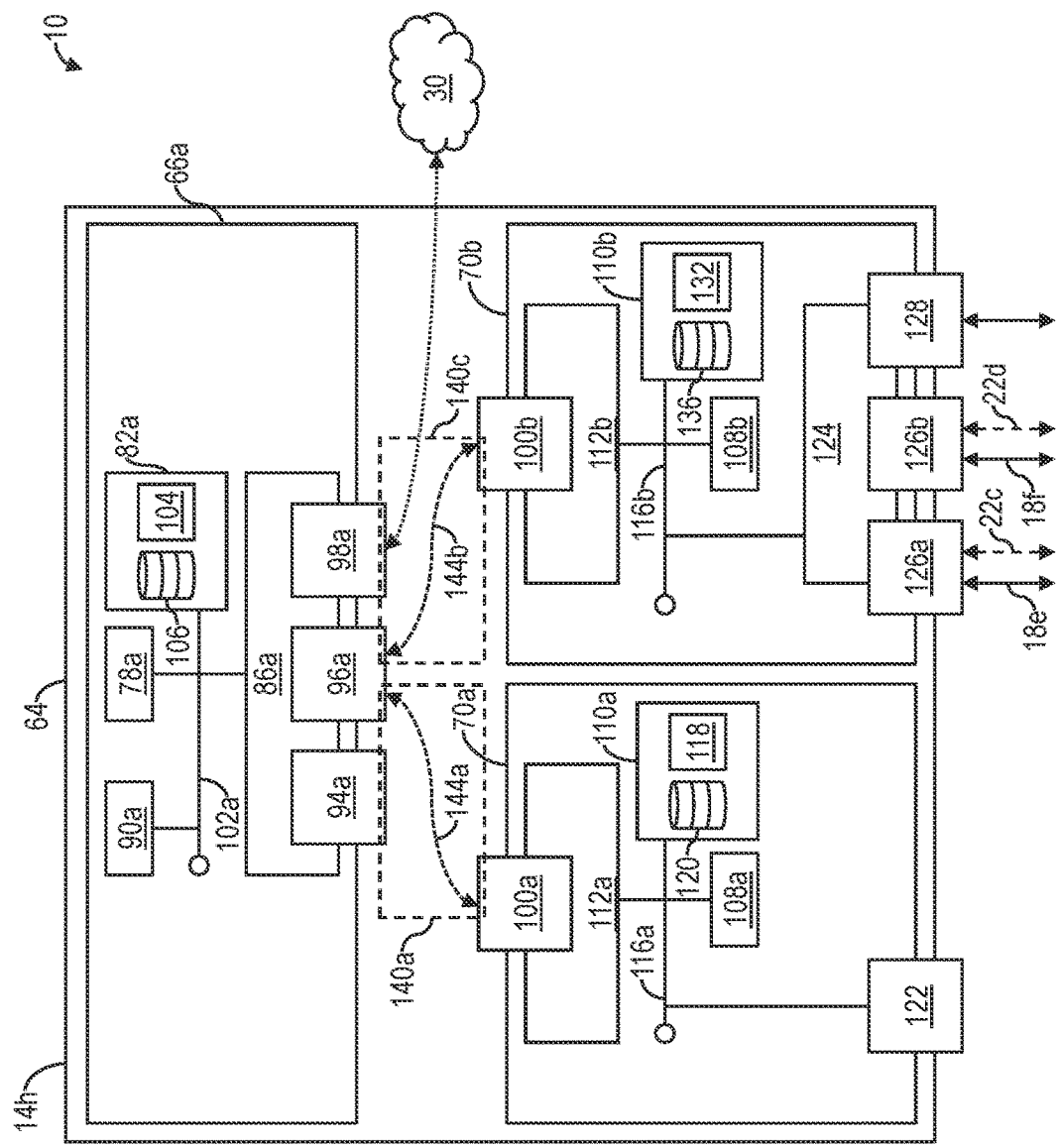
FIG. 5B is a diagrammatic view of another exemplary implementation of an optical network comprising a hybrid node constructed in accordance with the present disclosure.

Referring now to FIG. 5B, shown therein are a diagrammatic view of an exemplary implementation of the optical network 10 comprising a hybrid node 14*h* comprising both the line module 70*a* and the OPSM 70*b*. The hybrid node 14*h* may be an implementation of one of the terminal nodes 14*a*, 14*c* or the transponder nodes 16 shown in FIG. 1. While only the hybrid node 14*h* is shown, it should be understood that the optical network 10 may further comprise additional nodes 14 not shown in FIG. 5B.

As shown in FIG. 5B, the fast path 140 may be formed between the line module 70*a* and the OPSM 70*b* of the hybrid node 14*h*. Accordingly, the fast path 140 may extend from: (i) the line module 70*a* to the node controller 66*a* (via the first fast path segment 140*a*); and (ii) the node controller 66*a* to the OPSM 70*b* (via the third fast path segment 140*c*). In some implementations, the first fast path segment 140*a* utilizes the first intra-node communication network 144*a* and the third fast path segment 140*c* utilizes the second intra-node communication network 144*b*.

Figures 6A, 6B, 6C, 6D:
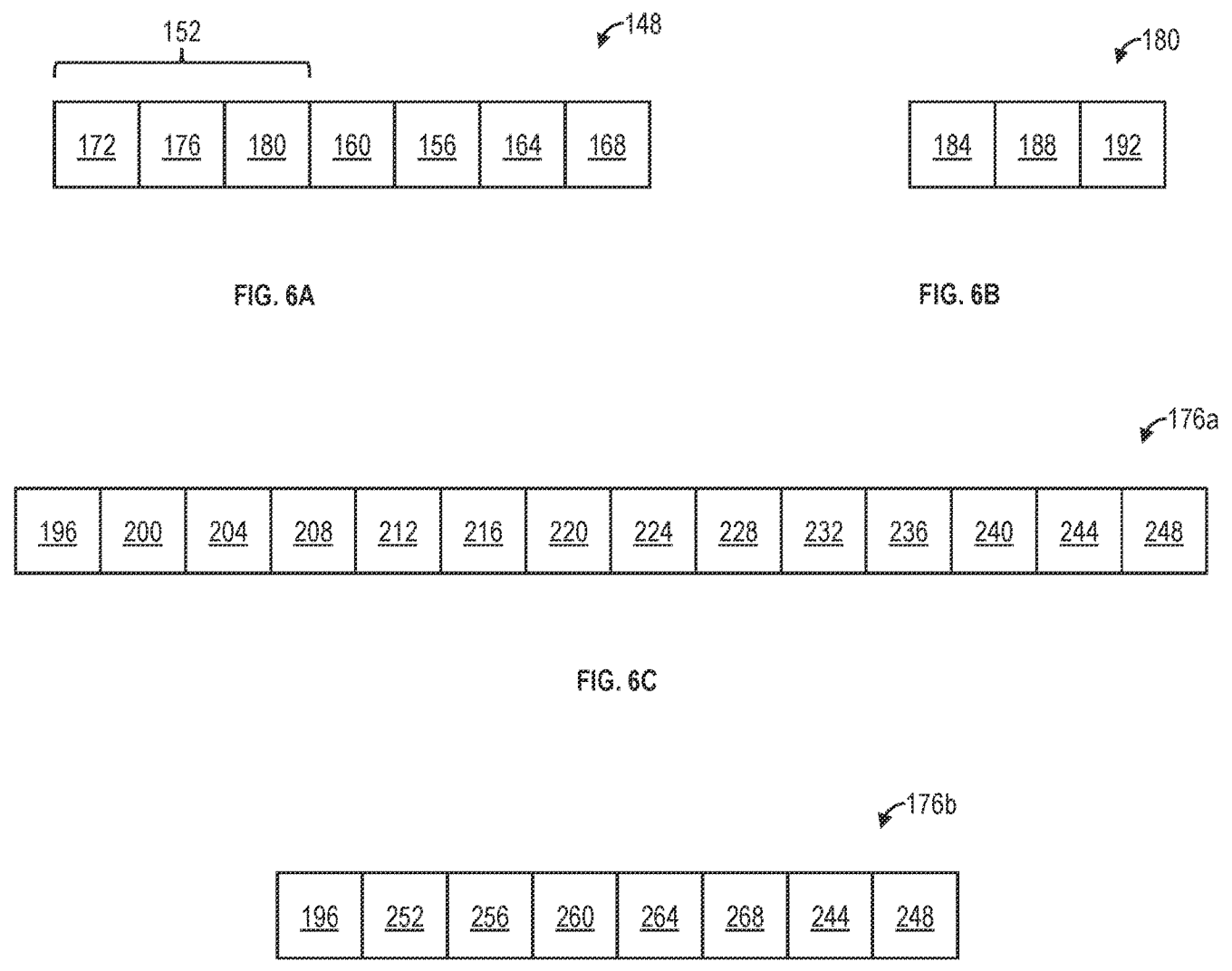

Referring now to FIG. 6A, shown therein is a diagrammatic view of an exemplary implementation of a fault packet 148 constructed in accordance with the present disclosure. As shown in FIG. 6A, the fault packet 148 generally comprises a packet header 152 and fault information 156 related to a fault detected by the coherent transceiver 122. In some implementations, the fault packet 148 further comprises a source node identifier 160, a Hash-based Message Authentication Code (HMAC) 164, and an Ethernet Frame Check Sequence (FCS) 168. The packet header 152 may comprise an Ethernet header 172, an IP header 176, and a SHIM header 180. In some implementations, the total length of the fault packet 148 is less than 1,500 bytes. In some implementations, the packet header 152 includes a sequence number and a sequence reset time encoded into the packet header 152 by the line module processor 108*a*.

The sequence number may be a positive integer that is incremented sequentially up from a minimum integer (e.g., a 1-byte integer) to a maximum integer (e.g., a 4-byte integer) as new fault packets 152 are generated. The line module 70*a* may store a last used sequence number in the data store 120 in the line module memory 110*a*. When the sequence number reaches the maximum integer, the line module processor 108*a* may be programmed to cause the sequence number to reset to the minimum integer when the next fault packet 152 is generated. The sequence number may also be reset to the minimum integer in other scenarios such as when the line module 70*a* reboots, the first node controller 66*a*-1 reboots, or there is a reconfiguration of the line module 70*a*, for instance. The sequence reset time is a timestamp of when the sequence number was last reset to the minimum integer.

The Ethernet header 172 generally includes a Source MAC Address, a Destination MAC Address, and a VLAN identifier. In some implementations, the Ethernet header 172 is 18 bytes in length. The IP header 176 may be one of an IPv4 header 176*a* (shown in FIG. 6C) and an IPv6 header 176*b* (shown in FIG. 6D). In some implementations, the IPv4 header 176*a* is 20 bytes in length and the IPv6 header 176*b* is 40 bytes in length. In some implementations, the SHIM header 180 is 4 bytes in length. Further, in some implementations, the source node identifier 160 is 20 bytes in length, the fault information 156 is 77 bytes in length, the HMAC 164 is 64 bytes in length, and the FCS 168 is 4 bytes in length.

Referring now to FIG. 6B, shown therein is a diagrammatic view of an exemplary implementation of the SHIM header 180 constructed in accordance with the present disclosure. As shown in FIG. 6B, the SHIM header 180 may include a header type 184, a reserved portion 188, and a Flow ID 192. In some implementations where the SHIM header 180 is 4 bytes in length, the header type 184 is 8 bits (i.e., 1 byte) in length, the reserved portion 188 is 8 bits (i.e., 1 byte) in length, and the Flow ID 192 is 16 bits (i.e., 2 bytes) in length. However, in some such implementations, only a lower 8 bits (i.e., 1 byte) of the Flow ID 192 is used, and the upper 8 bits (i.e., 1 byte) is set to 0x00. For the purposes of the present disclosure, the header type 184 of the SHIM header 180 may be set to 0x00.

Referring now to FIG. 6C, shown therein is a diagrammatic view of an exemplary implementation of the IPv4 header 176*a* constructed in accordance with the present disclosure. As shown in FIG. 6C, the IPv4 header 176*a* may include an IP version 196, a header length 200, a Type of Service (TOS) 204, a total length 208, an identification 212, a reserved portion 216, a Don't Fragment (DF) flag 220, a More Fragments (MF) flag 224, a fragment offset 228, a Time to Live (TTL) 232, a protocol 236, a header checksum 240, a Source IP Address 244, and a Destination IP Address 248. In some implementations, the IP version 196 is 4 bits in length, the header length 200 is 4 bits in length, the TOS 204 is 8 bits (i.e., 1 byte) in length, the total length 208 is 16 bits (i.e., 2 bytes) in length, the identification 212 is 16 bits (i.e., 2 bytes) in length, the reserved portion 216 is 1 bit in length and is set to 0x0, the DF flag 220 is 1 bit in length, the MF flag 224 is 1 bit in length, the fragment offset 228 may be 13 bits in length, the TTL 232 is 8 bits (i.e., 1 byte) in length, the protocol 236 is 8 bits (i.e., 1 byte) in length, and the header checksum 240 is 16 bits (i.e., 2 bytes) in length. In some implementations, the Source IP Address 244 of the IPv4 header 176*a* is 32 bits (i.e., 4 bytes) in length and the Destination IP Address 248 of the IPv4 header 176*a* is 32 bits (i.e., 4 bytes) in length. In some implementations, the protocol 236 is set as 241 (i.e., 0xF1).

Referring now to FIG. 6D, shown therein is a diagrammatic view of an exemplary implementation of the IPv6 header 176*b* constructed in accordance with the present disclosure. As shown in FIG. 6D, the IPv6 header 176*b* may include the IP version 196, a traffic class 252, a flow label 256, a payload length 260, a next header 264, a hop limit 268, the Source IP Address 244, and the Destination IP Address 248. In some implementations, the IP version 196 is 4 bits in length, the traffic class 252 is 8 bits (i.e., 1 byte) in length, the flow label 256 is 20 bits in length, the payload length 260 is 16 bits (i.e., 2 bytes) in length, the next header 264 is 8 bits (i.e., 1 byte) in length, and the hop limit 268 is 8 bits (i.e., 1 byte) in length. In some implementations, the Source IP Address 244 of the IPv6 header 176b is 128 bits (i.e., 16 bytes) in length and the Destination IP Address 248 of the IPv6 header 176b is 128 bits (i.e., 16 bytes) in length.

Figure 7A:
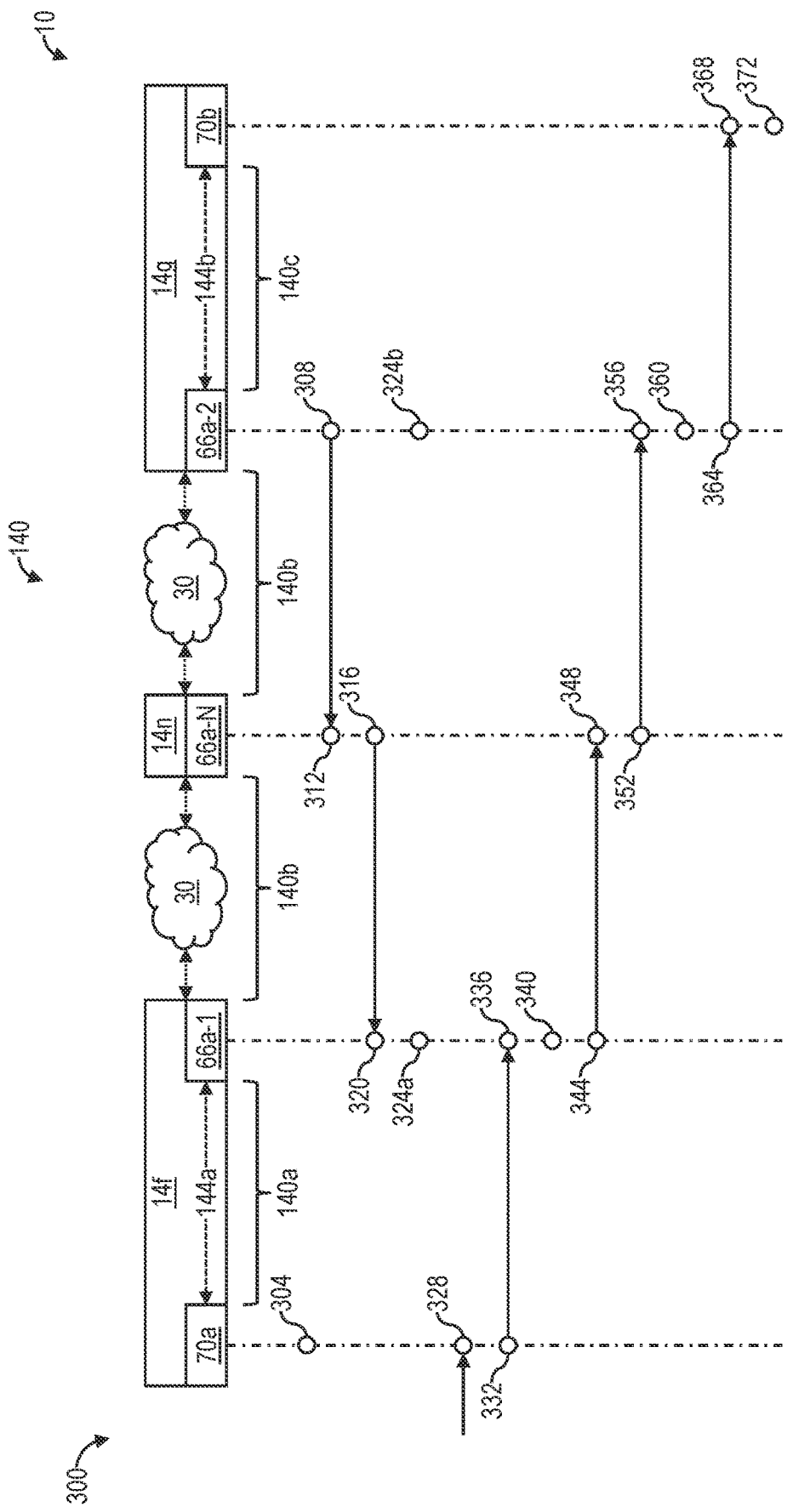
FIG. 7A is a process flow diagram of an exemplary method of performing a hardware-assisted digital fault relay in the optical network shown in FIG. 5A in accordance with one implementation with the present disclosure.

Referring now to FIG. 7A, shown therein is a diagrammatic view of an exemplary method 300 illustrating how the fault packet 148 is generated, forwarded, and processed using the fast path 140 between the head-end node 14f, the tail-end node 14g, and one or more intermediate node 14n (hereinafter the "intermediate node 14n") disposed therebetween. The intermediate node 14n may be constructed similarly to the head-end node 14f or the tail-end node 14g and generally comprises an intermediate node controller 66a-N and an intermediate network switch (not shown).

Initially, the head-end node 14f and the tail-end node 14g may exchange a secret key to be matched against a hash code sent by the head-end node 14f to the tail-end node 14g for HMAC 164 validation.

In step 304, the line module 70a may store first packet forwarding information in the data store 120. The first packet forwarding information may identify the first node controller 66a-1 as a first destination for a fault packet 148 on the fast path 140. In some implementations, the first packet forwarding information includes a first Flow ID 192.

In step 308, the second node controller 66a-2 of the tail-end node 14g may send second packet forwarding information to the second network switch 86a-2 and over the communication network 30. The second packet forwarding information may identify the second node controller 66a-2 as a second destination for the fault packet 148 on the fast path 140. In some implementations, the second packet forwarding information includes the second Flow ID 192. As described in further detail below, the second packet forwarding information may include: (i) a public (i.e., reachable over the communication network 30) IP address of the tail-end node 14g (ii) a private (i.e., internal to the optical network 10) IP address of the OPSM 70b of the tail-end node 14g; (iii) information indicative of an encapsulation protocol to be used, such as Generic Routing Encapsulation (GRE) or Simple IP (SIP), for example; and (iv) a second Flow ID 192, for example.

In step 312, the intermediate node controller 66a-N may receive the second packet forwarding information at the intermediate network switch (not shown).

In step 316, the intermediate node controller 66a-N may send the second packet forwarding information to the intermediate network switch (not shown) and over the communication network 30 to the first node controller 66a-1.

In step 320, the first node controller 66a-1 may receive the second packet forwarding information at the first network switch 86a-1. In some implementations where the intermediate node 14n is not disposed between the head-end node 14f and the tail-end node 14g, the second packet forwarding information may be sent by the second node controller 66a-2 and received directly by the first node controller 66a-1.

In step 324a, the first node controller 66a-1 may configure the first node controller FPGA 90a-1 so that a first lookup table (LUT) includes in a first LUT entry a first key-value pair having the second packet forwarding information as a first value and at least a portion of the first packet forwarding information (e.g., the first Flow ID 192) as a first key.

The construction of an LUT entry including packet forwarding information (e.g., the second packet forwarding information or the third packet forwarding information to be described below) is illustrated below in Table 1. In some implementations, the LUT comprises 256 LUT entries. In some implementations, the size of each of the one or more LUT entry is 52 bytes.

TABLE 1

LUT Entry Construction

| Position | Data |
| --- | --- |
| LD01 | Destination MAC Address (6B) |
| LD02 | Source MAC Address (6B) |
| LD03 | VLAN ID (2B) |
| LD04 | IP Version (1B) (i.e., "4" for IPv4 or "6" for IPv6) |
| LD05 | Source IP Address (16B) (i.e., only lower 4B used for IPv4) |
| LD06 | Destination IP Address (16B) (i.e., only lower 4B used for IPv4) |
| LD07 | TTL (1B) |
| LD08 | Target Flow ID 192 (2B) |
| LD09 | Ethernet 802.1q Priority (PCP/DEI) (1B) (i.e., only lower 4B used) |
| LD10 | IP TOS/Traffic Class (1B) |
| LD11-LDn | Unused |

In step 324b, the second node controller 66a-2 may configure the second node controller FPGA 90a-2 so that a second LUT includes in a second LUT entry a second key-value pair having third packet forwarding information as a second value and at least a portion of the second packet forwarding information (e.g., the second Flow ID 192) as a second key. The third packet forwarding information may identify the OPSM 70b as a third destination for the fault packet 148 on the fast path 140.

In step 328, the line module 70a may receive fault information 156 from, for example, the coherent transceiver 122. In response, the line module 70a may generate a fault packet 148 comprising a packet header 152 and the fault information 156. The packet header 152 may include the first packet forwarding information, which may include the first Flow ID 192.

In step 328, the Ethernet header 172 of the packet header 152 may be initially set as follows: the Source MAC Address may be set as the MAC Address of the line module 70a; the Destination MAC Address may be set as the MAC Address of the first node controller FPGA 90a-1; and the VLAN identifier may be set as the VLAN identifier of the first intra-node communication network 144a. In implementations where the head-end node 14f includes the shelf controller 66b, the Destination MAC Address may be set as the MAC Address of the default gateway of the shelf controller network switch 86b. Further, the 802.1q priority may be set to 0xE.

In step 328, the IP header 176 of the packet header 152 may be the IPv4 header 176a for transmission over the first intra-node communication network 144a, and the IPv4 header 176a of the packet header 152 may be initially set as follows: The Source IP Address 244 may be set as the IP address of the line module 70a; the Destination IP Address 248 may be set as the IP address of the first node controller FPGA 90a-1; the TTL 232 may be set as 2 (i.e., 0x02); and the TOS 204 may be set as the highest precedence or priority (i.e., 0xE0 or 0x07). The HMAC 164 may be generated for the fault information 156 using a hash function such as a Secure Hash Algorithm 512 (SHA-512), thereby producing a hash code which is 64 bytes in length.

In step 332, the line module 70a may send the fault packet 148 to the line module CM interface 100a and over the first intra-node communication network 144a to the first node controller 66a-1 identified by the first packet forwarding information.

In step 336, the first node controller 66a-1 may receive the fault packet 148 at the first network switch 86a-1 and forward the fault packet 148 to the first node controller FPGA 90a-1. In some implementations, one or more of the first network switch 86a-1 and the first node controller FPGA 90a-1 may be configured to drop the fault packet 148 if the first node controller 66a-1 is in a standby mode. Further, if the Flow ID 192 has a length is greater than a currently supported Flow ID 192 length supported by the first node controller FPGA 90a-1, the first node controller FPGA 90a-1 may discard the fault packet 148.

In step 340, the first node controller FPGA 90a-1 may retrieve the second packet forwarding information from the first LUT using at least a portion of the first packet forwarding information (i.e., the first Flow ID 192) as the first key. In some implementations, the first node controller FPGA 90a-1 may extract the first Flow ID 192 from the SHIM header 180 of the fault packet 148, look up the first Flow ID 192 to determine a pointer to the first LUT entry.

Further, the first node controller FPGA 90a-1 may update the packet header 152 of the fault packet 148 with the second packet forwarding information. The IP header 176 of the updated packet header 152 may be either of the IPv4 header 176a and the IPv6 header 176b for transmission over the communication network 30. In implementations where the updated packet header 152 includes the IPv4 header 176a, the first node controller FPGA 90a-1 may recalculate the header checksum 240 and the FCS 168 and insert the recalculated header checksum 240 into the IPv4 header 176a of the updated packet header 152 and the recalculated FCS 168 into the Ethernet header 172 of the updated packet header 152.

The construction of the Ethernet header 172 in the updated packet header 152, such as in step 340 and step 360 to be described below, is illustrated below in Table 2.

TABLE 2

Ethernet Header Construction in Outgoing Fault Packet 148

| Field | Replacement | Description |
|---|---|---|
| Destination MAC Address | LD01 (see Table 1) | |
| Source MAC Address | LD02 (see Table 1) | |
| TPID | IN.EthernetHeader.TPID | Copied from Ethernet Header of incoming packet (can be assumed to be 0x8100) |
| PCP/DEI | LD09 (see Table 1) | Only lower 4b copied |
| VLAN ID | LD03 (see Table 1) | Only lower 12b copied |
| Type/Length | "0x0800" for IPv4 or "0x86DD" for IPv6 (i.e., depending on IP Header Type of outgoing packet) | |
| FCS 168 | Recalculated FCS 168 (CRC) | Recalculated after reconstructing entire fault packet 148 |

Accordingly, in step 340, the Ethernet header 172 in the updated packet header 152 may be set as follows: the Source MAC Address may be set as the MAC Address of the first node controller 66a-1; the Destination MAC Address may be set as the MAC Address of the intermediate node controller 66a-N (or the second node controller 66a-2 if the intermediate node 14n is not disposed between the head-end node 14f and the tail-end node 14g); and the VLAN identifier may be set as the VLAN identifier of the first network switch 86a-1.

Where the IPv4 header 176a is used for transmission over the communication network 30, the construction of the updated IPv4 header 176a, such as in step 340 and step 360 to be described below, is illustrated below in Table 3.

TABLE 3

IPv4 Header 176a Construction in Outgoing Fault Packet 148 from IPv4 Header 176a of Incoming Fault Packet 148

| Field | Replacement | Description |
|---|---|---|
| Version 196 | 4 | |
| Header Length 200 | 5 | Number of 32b words |
| TOS 204 | LD10 (see Table 1) | |
| Total Length 208 | IN.IPv4.TotalLength | Copied from IPv4 Header 176a of incoming fault packet 148 |
| Identification 212 | Running number rolled-over at 65535 | |
| DF 220 | 1 | |
| MF 224 | 0 | |
| Fragment Offset 228 | 0 | |
| TTL 232 | LD07 (see Table 1) | |

TABLE 3-continued

IPv4 Header 176a Construction in Outgoing Fault Packet
148 from IPv4 Header 176a of Incoming Fault Packet 148

| Field | Replacement | Description |
| --- | --- | --- |
| Protocol 236 | IN.IPv4.Protocol | Copied from IPv4 Header 176a of incoming fault packet 148 |
| Header Checksum 240 | Recalculated Header Checksum 240 | |
| Source IP Address 244 | LD05 (see Table 1) | Only lower 4B copied |
| Destination IP Address 248 | LD06 (see Table 1) | Only lower 4B copied |

Accordingly, where the IPv4 header 176a is used for transmission over the communication network 30, in step 340, the IPv4 header 176a of the updated packet header 152 may be set as follows: the IP version 196 may be set as 4 (i.e., 0x04); the Source IP Address 244 may be set as the IP address of the first network switch 86a-1; the Destination IP Address 248 may be set as the IP address of the second network switch 86a-2; and the TTL 232 may be set as the number of nodes 14 in the optical network 10 minus one (i.e., the number of hops).

Where the IPv6 header 176b is used for transmission over the communication network 30, the construction of the IPv6 header 176b to replace the IPv4 header 176a of the fault packet 148, such as in step 340, is illustrated below in Table 4.

TABLE 4

IPv6 Header 176b Construction in Outgoing Fault Packet
148 from IPv4 Header 176a of Incoming Fault Packet 148

| Field | Replacement | Description |
| --- | --- | --- |
| Version 196 | 6 | |
| Traffic Class 252 | LD10 (See Table 1) | |
| Flow Label 256 | 0 | |
| Payload Length 260 | IN.IPv4.Total Length − 20 | Determined using Total Length 208 of IPv4 Header 176a of incoming packet |
| Next Header 264 | IN.IPv4.Protocol | Copied from IPv4 Header 176a of incoming packet |
| Hop Limit 268 | LD07 (see Table 1) | |
| Source IP Address 244 | LD05 | |
| Destination IP Address 248 | LD06 | |

Accordingly, where the IPv6 header 176b is used for transmission over the communication network 30, in step 340, the IPv6 header 176b of the updated packet header 152 may be set as follows: the IP version 196 may be set as 6 (i.e., 0x06); the Source IP Address 244 may be set as the IP address of the first network switch 86a-1; the Destination IP Address 248 may be set as the IP address of the second network switch 86a-2; and the hop limit 268 may be set as the number of nodes 14 in the optical network 10 minus one (i.e., the number of hops in the optical network 10).

The construction of the SHIM header 180 in the updated packet header 152, such as in step 340 and step 360 to be described below, is illustrated below in Table 5.

TABLE 5

SHIM Header 180 Construction in Outgoing Fault Packet 148

| Field | Replacement | Description |
| --- | --- | --- |
| Header Type 184 | IN.SHIM.HeaderType | Copied from SHIM Header 180 of incoming fault packet 148 |
| Reserved Portion 188 | IN.SHIM.Reserved | Copied from SHIM Header 180 of incoming fault packet 148 |
| Flow ID 192 | LD08 (see Table 1) | |

Accordingly, in step 340, the Flow ID 192 of the updated packet header 152 may be set as the Flow ID 192 of the tail-end node 14g.

In step 344, the first node controller 66a-1 may send the fault packet 148 to the first network switch 86a-1 and over the communication network 30 to the intermediate node controller 66a-N (i.e., toward the tail-end node 14g identified by the second packet forwarding information).

In step 348, the intermediate node controller 66a-N may receive the fault packet 148 at the intermediate network switch (not shown). Quality of Service (QoS) handling at the intermediate node 14n may be based on packet filtering rules that match the protocol 236 (i.e., filtering out packets that do not have the protocol 236 set to 241 or 0xF1). Further, in some implementations, an ingress policer may protect against packet rate or burst anomalies.

In step 352, the intermediate node controller 66a-N may forward the fault packet 148 to the intermediate network switch (not shown) and over the communication network 30 to the second node controller 66a-2.

In step 356, the second node controller 66a-2 may receive the fault packet 148 at the second network switch 86a-2 and forward the fault packet 148 to the second node controller FPGA 90a-2. In some implementations where the intermediate node 14n is not disposed between the head-end node 14f and the tail-end node 14g, the fault packet 148 may be sent by the first node controller 66a-1 and received directly by the second node controller 66a-2. Further, if the Flow ID 192 has a length is greater than a currently supported Flow ID 192 length supported by the first node controller FPGA 90a-1, the first node controller FPGA 90a-1 may discard the fault packet 148.

In step 360, the second node controller FPGA 90a-2 may retrieve the third packet forwarding information from the second LUT using at least a portion of the second packet forwarding information (i.e., the second Flow ID 192) as the second key. Further, the second node controller FPGA 90a-2 may update the packet header 152 of the fault packet 148 with the third packet forwarding information. The IP header 176 of the updated packet header 152 may be the IPv4 header 176a for transmission over the second intra-node communication network 144b.

Further, in step 360, the Ethernet header 172 in the updated packet header 152 may be set as follows: the Source MAC Address may be set as the MAC Address of the second node controller 66a-2; the Destination MAC Address may be set as the MAC Address of the OPSM 70b; and the VLAN identifier may be set as the VLAN identifier of the second network switch 86a-2.

Where the IPv6 header 176b is used for transmission over the communication network 30, the construction of the IPv4 header 176a to replace the IPv6 header 176b of the fault packet 148, such as in step 360, is illustrated below in Table 6.

TABLE 6

IPv4 Header 176a Construction in Outgoing Fault Packet 148 from IPv6 Header 176b of Incoming Fault Packet 148

| Field | Replacement | Description |
| --- | --- | --- |
| Version 196 | 4 | |
| Header Length 200 | 5 | Number of 32b words |
| Type of Service 204 | LD10 (see Table 1) | |
| Total Length 208 | IN.IPv6.PayloadLength + 20 | Determined using Payload Length 260 of IPv6 Header 176b of incoming fault packet 148 |
| Identification 212 | Running number rolled-over at 65535 | |
| DF 220 | 1 | |
| MF 224 | 0 | |
| Fragment Offset 228 | 0 | |
| TTL 232 | LD07 (see Table 1) | |
| Protocol 236 | IN.IPv6.NextHeader | Copied from IPv6 Header 176b of incoming fault packet 148 |
| Header Checksum 240 | Recalculated Header Checksum 240 | |
| Source IP Address 244 | LD05 (see Table 1) | Only lower 4B copied |
| Destination IP Address 248 | LD06 (see Table 1) | Only lower 4B copied |

Accordingly, where the IPv6 header 176b is used for transmission over the communication network 30, in step 360, the IPv4 header 176a of the updated packet header 152 may be set as follows: the IP version 196 may be set as 4 (i.e., 0x04); the Source IP Address 244 may be set as the IP address of the second node controller 66a-2; the Destination IP Address 248 may be set as the IP address of the OPSM 70b; and the TTL 232 may be set as 1 (i.e., 0x01).

In step 364, the second node controller 66a-2 may send the fault packet 148 to the second network switch 86a-2 and over the second intra-node communication network 144b to the OPSM 70b identified by the third packet forwarding information.

In step 368, the OPSM 70b may receive the fault packet 148 at the OPSM CM interface 100b. The OPSM 70b may generate a hash code against the fault information 156 using the secret key exchanged between the head-end node 14f and the tail-end node 14g and determine whether the generated hash code matches the received hash code in the packet header 152 of the fault packet 148. If the generated hash code does not match the received hash code, then the fault packet 148 may be dropped.

In step 368, the OPSM 70b may determine if the fault information 156 contained in the fault packet 148 is new fault information 156 by comparing the sequence number and the sequence reset time in the packet header 152 to a stored sequence number and a stored sequence reset time stored in the OPSM memory 110b. If the sequence number in the packet header 152 is greater than the stored sequence number and the sequence reset time in the packet header 152 is equal to the stored sequence reset time, the fault information 156 is determined to be new fault information 156. If the fault information 156 is determined to be new fault information 156, the OPSM processor 108b may be programmed to replace the stored sequence number with the sequence number in the packet header 152 and the stored sequence reset time with the sequence reset time in the packet header 152. In some embodiments, the stored sequence number and the stored sequence reset time may be stored in the OPSM data store 136 in the OPSM memory 110b.

In step 372, the OPSM 70b may switch the optical switch 124 based at least in part on the fault information 156.

Referring now to FIG. 7B, shown therein is a diagrammatic view of an exemplary method 400 illustrating how the fault packet 148 is generated, forwarded, and processed using the fast path 140 within the hybrid node 14h.

In step 404, the line module 70a may store first packet forwarding information in the data store 120. The first packet forwarding information may identify the node controller 66a as a first destination for a fault packet 148 on the fast path 140. In some implementations, the first packet forwarding information includes a first Flow ID 192.

In step 408, the node controller 66a may configure the node controller FPGA 90a so that an LUT includes in an LUT entry a key-value pair having the second packet forwarding information as a first value and at least a portion of the first packet forwarding information (e.g., the first Flow ID 192) as a key.

In step 412, the line module 70a may receive fault information 156 from, for example, the coherent transceiver 122. In response, the line module 70a may generate a fault packet 148 comprising a packet header 152 and the fault information 156. The packet header 152 may include the first packet forwarding information, which may include the first Flow ID 192. The IP header 176 of the packet header 152 may be the IPv4 header 176a for transmission over the first intra-node communication network 144a.

The Ethernet header 172 of the packet header 152 may be initially set as follows: the Source MAC Address may be set as the MAC Address of the line module 70a; the Destination MAC Address may be set as the MAC Address of the node controller FPGA 90a; and the VLAN identifier may be set as the VLAN identifier of the first intra-node communication network 144a. In implementations where the hybrid node 14h includes the shelf controller 66b, the Destination MAC Address may be set as the MAC Address of the default gateway of the shelf controller network switch 86b.

In step 416, the line module 70a may send the fault packet 148 to the line module CM interface 100a and over the first intra-node communication network 144a to the node controller 66a identified by the first packet forwarding information.

In step 420, the node controller 66a may receive the fault packet 148 at the network switch 86a and forward the fault packet 148 to the node controller FPGA 90a.

In step 424, the node controller FPGA 90a may retrieve the second packet forwarding information from the LUT using at least a portion of the first packet forwarding information (i.e., the first Flow ID 192) as the key. Further, the node controller FPGA 90a may update the packet header 152 of the fault packet 148 with the second packet forwarding information. The IP header 176 of the updated packet header 152 may be the IPv4 header 176a for transmission over the second intra-node communication network 144b. Further, the node controller FPGA 90a may recalculate the header checksum 240 and the FCS 168 and insert the recalculated header checksum 240 into the IPv4 header 176a of the updated packet header 152 and the recalculated FCS 168 into the Ethernet header 172 of the updated packet header 152.

In step 428, the node controller 66a may send the fault packet 148 to the network switch 86a and over the second intra-node communication network 144b to the OPSM 70b identified by the second packet forwarding information.

In step 432, the OPSM 70b may receive the fault packet 148 at the OPSM CM interface 100b. The OPSM 70b may determine if the fault information 156 contained in the fault packet 148 is new fault information 156 by comparing the sequence number and the sequence reset time in the packet header 152 to a stored sequence number and a stored sequence reset time stored in the OPSM memory 110b. If the sequence number in the packet header 152 is greater than the stored sequence number and the sequence reset time in the packet header 152 is equal to the stored sequence reset time, the fault information 156 is determined to be new fault information 156. If the fault information 156 is determined to be new fault information 156, the OPSM processor 108b may be programmed to replace the stored sequence number with the sequence number in the packet header 152 and the stored sequence reset time with the sequence reset time in the packet header 152. In some embodiments, the stored sequence number and the stored sequence reset time may be stored in the OPSM data store 136 in the OPSM memory 110b.

In step 436, the OPSM 70b may switch the optical switch 124 based at least in part on the fault information 156.

In some implementations, the Destination MAC Address stored in the LUT entries may be updated from time to time by the node controller processor 78a or the network switch 86a based on a change in IP routing information or an Address Resolution Protocol (ARP) cache. Accordingly, the node controller processor 78a or the network switch 86a may monitor for changes in the IP routing information or the ARP cache.

Non-Limiting Illustrative Embodiments of the Inventive Concept(s)

Illustrative embodiment 1. A head-end node, comprising: a node controller; and a line module comprising a processor and a non-transitory processor-readable medium storing processor-executable instructions that when executed by the processor cause the processor to: receive fault information related to a fault; generate a fault packet comprising a packet header and the fault information, the packet header including first packet forwarding information identifying the node controller as a first destination; and send the fault packet to the node controller identified by the first packet forwarding information; and wherein the node controller comprises packet forwarding circuitry configured to: retrieve second packet forwarding information from a table using at least a portion of the first packet forwarding information as a key, the second packet forwarding information identifying a tail-end node as a second destination; update the packet header of the fault packet with the second packet forwarding information; and send the fault packet toward the tail-end node identified by the second packet forwarding information.

Illustrative embodiment 2. The head-end node of illustrative embodiment 1, wherein the line module further comprises a network switch configured to communicate using a communication network, and sending the fault packet to the node controller is further defined as sending, via the network switch using the communication network, the fault packet to the node controller identified by the first packet forwarding information.

Illustrative embodiment 3. The head-end node of illustrative embodiment 2, wherein the network switch is a first network switch, the node controller comprises a second network switch configured to communicate using the communication network, and the packet forwarding circuitry is further configured to, prior to retrieving the second packet forwarding information from the table, receive, via the second network switch using the communication network, the fault packet.

Illustrative embodiment 4. The head-end node of illustrative embodiment 2, wherein the communication network is a first communication network, the network switch is a first network switch, the node controller comprises a second network switch configured to communicate using a second communication network, and sending the fault packet to the tail-end node is further defined as sending, via the second network switch using the second communication network, the fault packet toward the tail-end node identified by the second packet forwarding information.

Illustrative embodiment 5. The head-end node of illustrative embodiment 4, wherein the first communication network is a first virtual local area network, and the second communication network is a second virtual local area network.

Illustrative embodiment 6. The head-end node of illustrative embodiment 1, wherein the processor is a first processor, the non-transitory processor-readable medium is a first non-transitory processor-readable medium, the processor-executable instructions are first processor-executable instructions, and the node controller further comprises a second processor and a second non-transitory processor-readable medium storing second processor-executable instructions that when executed by the second processor cause the second processor to, prior to the first processor receiving the fault information: receive the second packet forwarding information; and configure the packet forwarding circuitry so that the table includes a key-value pair having the second packet forwarding information as a value and at least a portion of the first packet forwarding information as the key.

Illustrative embodiment 7. The head-end node of illustrative embodiment 1, wherein the processor-executable instructions when executed by the processor further cause the processor to, prior to receiving the fault information, store the first packet forwarding information.

Illustrative embodiment 8. A tail-end node, comprising: an optical protection switching module comprising a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and a node controller comprising packet forwarding circuitry configured to: receive a fault packet comprising a packet header and fault information related to a fault, the packet header including first packet forwarding information identifying the tail-end node as a first destination; retrieve second packet forwarding information from a table using at least a portion of the first packet forwarding information as a key, the second packet forwarding information identifying the optical protection switching module as a second destination; update the packet header of the fault packet with the second packet forwarding information; and send the fault packet to the optical protection switching module identified by the second packet forwarding information; and wherein the optical protection switching module further comprises a processor and a non-transitory processor-readable medium storing processor-executable instructions that when executed by the processor cause the processor to switch the optical switch based on the fault information.

Illustrative embodiment 9. The tail-end node of illustrative embodiment 8, wherein the node controller further comprises a network switch configured to communicate using a communication network, and receiving the fault packet is further defined as receiving, via the network switch communicating using the communication network, the fault packet comprising the packet header and the fault information related to the fault.

Illustrative embodiment 10. The tail-end node of illustrative embodiment 9, wherein the communication network is a first communication network, the network switch is further configured to communicate using a second communication network, and sending the fault packet to the optical protection switching module is further defined as sending, via the network switch using the second communication network, the fault packet to the optical protection switching module identified by the second packet forwarding information.

Illustrative embodiment 11. The tail-end node of illustrative embodiment 10, wherein the network switch is a first network switch, the optical protection switching module further comprises a second network switch configured to communicate using the second communication network, and the processor-executable instructions when executed by the processor may further cause the processor to, prior to switching the optical switch, receive, via the second network switch using the second communication network, the fault packet.

Illustrative embodiment 12. The tail-end node of illustrative embodiment 10, wherein the first communication network is a first virtual local area network, and the second communication network is a second virtual local area network.

Illustrative embodiment 13. The tail-end node of illustrative embodiment 8, wherein the processor is a first processor, the non-transitory processor-readable medium is a first non-transitory processor-readable medium, the processor-executable instructions are first processor-executable instructions, and the node controller further comprises a second processor and a second non-transitory processor-readable medium storing second processor-executable instructions that when executed by the second processor cause the second processor to, prior to the packet forwarding circuitry receiving the fault packet: send the first packet forwarding information to a head-end node; and configure the packet forwarding circuitry so that the table includes a key-value pair having the second packet forwarding information as a value and at least a portion of the first packet forwarding information as the key.

Illustrative embodiment 14. A hybrid node, comprising: a node controller; an optical protection switching module comprising a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and a line module comprising a first processor and a first non-transitory processor-readable medium storing first processor-executable instructions that when executed by the first processor cause the first processor to: receive fault information related to a fault; generate a fault packet comprising a packet header and the fault information, the packet header including first packet forwarding information identifying the node controller as a first destination; and send the fault packet to the node controller identified by the first packet forwarding information; wherein the node controller comprises packet forwarding circuitry configured to: retrieve second packet forwarding information from a table using at least a portion of the first packet forwarding information as a key, the second packet forwarding information identifying the optical protection switching module as a second destination; update the packet header of the fault packet with the second packet forwarding information; and send the fault packet to the optical protection switching module identified by the second packet forwarding information; and wherein the optical protection switching module further comprises a second processor and a second non-transitory processor-readable medium storing second processor-executable instructions that when executed by the second processor cause the second processor to switch the optical switch based on the fault information.

Illustrative embodiment 15. The hybrid node of illustrative embodiment 14, wherein the line module further comprises a network switch configured to communicate using a communication network, and sending the fault packet to the node controller is further defined as sending, via the network switch using the communication network, the fault packet to the node controller identified by the first packet forwarding information.

Illustrative embodiment 16. The hybrid node of illustrative embodiment 15, wherein the network switch is a first network switch, the node controller comprises a second network switch configured to communicate using the communication network, and the packet forwarding circuitry is further configured to, prior to retrieving the second packet forwarding information from the table, receive, via the second network switch using the communication network, the fault packet.

Illustrative embodiment 17. The hybrid node of illustrative embodiment 16, wherein sending the fault packet to the optical protection switching module is further defined as sending, via the second network switch using the communication network, the fault packet to the optical protection switching module identified by the second packet forwarding information.

Illustrative embodiment 18. The hybrid node of illustrative embodiment 17, wherein the optical protection switching module further comprises a third network switch configured to communicate using the communication network, and the second processor-executable instructions when executed by the second processor may further cause the second processor to, prior to switching the optical switch, receive, via the third network switch using the communication network, the fault packet.

Illustrative embodiment 19. The hybrid node of illustrative embodiment 18, wherein the communication network is a virtual local area network.

Illustrative embodiment 20. The hybrid node of illustrative embodiment 14, wherein the node controller further comprises a third processor and a third non-transitory processor-readable medium storing third processor-executable instructions that when executed by the third processor cause the third processor to, prior to the packet forwarding circuitry retrieving the second packet forwarding information, configure the packet forwarding circuitry so that the table includes a key-value pair having the second packet forwarding information as a value and at least a portion of the first packet forwarding information as the key.

Illustrative embodiment 21. The hybrid node of illustrative embodiment 14, wherein the first processor-executable instructions when executed by the first processor further cause the first processor to, prior to receiving the fault signal, store the first packet forwarding information.

Illustrative embodiment 22. An optical network, comprising: a tail-end node; and a head-end node, comprising: a first node controller; and a line module comprising a first processor and a first non-transitory processor-readable medium storing first processor-executable instructions that when executed by the first processor cause the first processor to: receive fault information related to a fault; generate a fault packet comprising a packet header and the fault information, the packet header including first packet forwarding information identifying the first node controller as a first destination; and send the fault packet to the first node controller identified by the first packet forwarding information; and wherein the first node controller comprises first packet forwarding circuitry configured to: retrieve second packet forwarding information from a first table using at least a portion of the first packet forwarding information as a first key, the second packet forwarding information identifying the tail-end node as a second destination; update the packet header of the fault packet with the second packet forwarding information; and send the fault packet toward the tail-end node identified by the second packet forwarding information; and wherein the tail-end node comprises: an optical protection switching module comprising a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and a second node controller comprising second packet forwarding circuitry configured to: retrieve third packet forwarding information from a second table using at least a portion of the second packet forwarding information as a second key, the third packet forwarding information identifying the optical protection switching module as a third destination; update the packet header of the fault packet with the third packet forwarding information; and send the fault packet to the optical protection switching module identified by the third packet forwarding information; and wherein the optical protection switching module further comprises a second processor and a second non-transitory processor-readable medium storing processor-executable instructions that when executed by the second processor cause the second processor to switch the optical switch based on the fault information.

Illustrative embodiment 23. The optical network of illustrative embodiment 22, wherein the line module further comprises a network switch configured to communicate using a communication network, and sending the fault packet to the first node controller is further defined as sending, via the network switch using the communication network, the fault packet to the first node controller identified by the first packet forwarding information.

Illustrative embodiment 24. The optical network of illustrative embodiment 23, wherein the network switch is a first network switch, the communication network is a first communication network, the first node controller comprises a second network switch configured to communicate using the first communication network and a second communication network, and sending the fault packet to the tail-end node is further defined as sending, via the second network switch using the second communication network, the fault packet toward the tail-end node identified by the second packet forwarding information.

Illustrative embodiment 25. The optical network of illustrative embodiment 24, wherein the second node controller further comprises a third network switch configured to communicate using a third communication network, and sending the fault packet to the optical protection switching module is further defined as sending, via the third network switch using the third communication network, the fault packet to the optical protection switching module identified by the third packet forwarding information.

Illustrative embodiment 26. The optical network of illustrative embodiment 25, wherein the first communication network is a first virtual local area network, the second communication network is a second virtual local area network, and the third communication network is a third virtual local area network.

Illustrative embodiment 27. The optical network of illustrative embodiment 22, wherein the first node controller further comprises a third processor and a third non-transitory processor-readable medium storing third processor-executable instructions that when executed by the third processor cause the third processor to, prior to receiving the fault information: configure the first packet forwarding circuitry so that the first table includes a key-value pair having the second packet forwarding information as a value and at least a portion of the first packet forwarding information as the first key.

Illustrative embodiment 28. The optical network of illustrative embodiment 27, wherein the key-value pair is a first key-value pair, the value is a first value, and the second node controller further comprises a fourth processor and a fourth non-transitory processor-readable medium storing fourth processor-executable instructions that when executed by the fourth processor cause the fourth processor to, prior to retrieving the third packet forwarding information: send the second packet forwarding information to the head-end node; and configure the second packet forwarding circuitry so that the second table includes a second key-value pair having the third packet forwarding information as a second value and at least a portion of the second packet forwarding information as the second key.

Illustrative embodiment 29. The optical network of illustrative embodiment 22, wherein the first processor-executable instructions when executed by the first processor further cause the first processor to, prior to receiving the fault information, store the first packet forwarding information.

Illustrative embodiment 30. The optical network of illustrative embodiment 22, wherein the first packet forwarding circuitry is a first field-programmable gate array (FPGA), and the second packet forwarding circuitry is a second FPGA.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A head-end node, comprising:
   a node controller; and
   a line module comprising a processor and a non-transitory processor-readable medium storing processor-executable instructions that when executed by the processor cause the processor to:
      receive fault information related to a fault;
      generate a fault packet comprising a packet header and the fault information, the packet header including first packet forwarding information identifying the node controller as a first destination; and
      send the fault packet to the node controller identified by the first packet forwarding information; and
   wherein the node controller comprises packet forwarding circuitry configured to:
      retrieve second packet forwarding information from a table using at least a portion of the first packet forwarding information as a key, the second packet forwarding information identifying a tail-end node as a second destination;
      update the packet header of the fault packet with the second packet forwarding information; and
      send the fault packet toward the tail-end node identified by the second packet forwarding information.

2. The head-end node of claim 1, wherein the line module further comprises a network switch configured to communicate using a communication network, and sending the fault packet to the node controller is further defined as sending, via the network switch using the communication network, the fault packet to the node controller identified by the first packet forwarding information.

3. The head-end node of claim 2, wherein the communication network is a first communication network, the network switch is a first network switch, the node controller comprises a second network switch configured to communicate using a second communication network, and sending the fault packet to the tail-end node is further defined as sending, via the second network switch using the second communication network, the fault packet toward the tail-end node identified by the second packet forwarding information.

4. The head-end node of claim 3, wherein the first communication network is a first virtual local area network, and the second communication network is a second virtual local area network.

5. The head-end node of claim 1, wherein the processor is a first processor, the non-transitory processor-readable medium is a first non-transitory processor-readable medium, the processor-executable instructions are first processor-executable instructions, and the node controller further comprises a second processor and a second non-transitory processor-readable medium storing second processor-executable instructions that when executed by the second processor cause the second processor to, prior to the first processor receiving the fault information:
   receive the second packet forwarding information; and
   configure the packet forwarding circuitry so that the table includes a key-value pair having the second packet forwarding information as a value and at least a portion of the first packet forwarding information as the key.

6. The head-end node of claim 1, wherein the processor-executable instructions when executed by the processor further cause the processor to, prior to receiving the fault information, store the first packet forwarding information.

7. A tail-end node, comprising:
   an optical protection switching module comprising a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and
   a node controller comprising packet forwarding circuitry configured to:
      receive a fault packet comprising a packet header and fault information related to a fault, the packet header including first packet forwarding information identifying the tail-end node as a first destination;
      retrieve second packet forwarding information from a table using at least a portion of the first packet forwarding information as a key, the second packet forwarding information identifying the optical protection switching module as a second destination;
      update the packet header of the fault packet with the second packet forwarding information; and
      send the fault packet to the optical protection switching module identified by the second packet forwarding information; and
   wherein the optical protection switching module further comprises a processor and a non-transitory processor-readable medium storing processor-executable instructions that when executed by the processor cause the processor to switch the optical switch based on the fault information.

8. The tail-end node of claim 7, wherein the node controller further comprises a network switch configured to communicate using a communication network, and receiving the fault packet is further defined as receiving, via the network switch communicating using the communication network, the fault packet comprising the packet header and the fault information related to the fault.

9. The tail-end node of claim 8, wherein the communication network is a first communication network, the network switch is further configured to communicate using a second communication network, and sending the fault packet to the optical protection switching module is further defined as sending, via the network switch using the second communication network, the fault packet to the optical protection switching module identified by the second packet forwarding information.

10. The tail-end node of claim 9, wherein the first communication network is a first virtual local area network, and the second communication network is a second virtual local area network.

11. The tail-end node of claim 7, wherein the processor is a first processor, the non-transitory processor-readable medium is a first non-transitory processor-readable medium, the processor-executable instructions are first processor-executable instructions, and the node controller further comprises a second processor and a second non-transitory processor-readable medium storing second processor-executable instructions that when executed by the second processor cause the second processor to, prior to the packet forwarding circuitry receiving the fault packet:
send the first packet forwarding information to a head-end node; and
configure the packet forwarding circuitry so that the table includes a key-value pair having the second packet forwarding information as a value and at least a portion of the first packet forwarding information as the key.

12. An optical network, comprising:
a tail-end node; and
a head-end node, comprising:
a first node controller; and
a line module comprising a first processor and a first non-transitory processor-readable medium storing first processor-executable instructions that when executed by the first processor cause the first processor to:
receive fault information related to a fault;
generate a fault packet comprising a packet header and the fault information, the packet header including first packet forwarding information identifying the first node controller as a first destination; and
send the fault packet to the first node controller identified by the first packet forwarding information; and
wherein the first node controller comprises first packet forwarding circuitry configured to:
retrieve second packet forwarding information from a first table using at least a portion of the first packet forwarding information as a first key, the second packet forwarding information identifying the tail-end node as a second destination;
update the packet header of the fault packet with the second packet forwarding information; and
send the fault packet toward the tail-end node identified by the second packet forwarding information; and
wherein the tail-end node comprises:
an optical protection switching module comprising a first line port connected to a working path, a second line port connected to a protection path, a system port, and an optical switch coupled to the first line port to receive first optical signals from the working path and the second line port to receive second optical signals from the protection path for selectively switching optical signals from the first line port or the second line port to the system port; and
a second node controller comprising second packet forwarding circuitry configured to:
retrieve third packet forwarding information from a second table using at least a portion of the second packet forwarding information as a second key, the third packet forwarding information identifying the optical protection switching module as a third destination;
update the packet header of the fault packet with the third packet forwarding information; and
send the fault packet to the optical protection switching module identified by the third packet forwarding information; and
wherein the optical protection switching module further comprises a second processor and a second non-transitory processor-readable medium storing processor-executable instructions that when executed by the second processor cause the second processor to switch the optical switch based on the fault information.

13. The optical network of claim 12, wherein the line module further comprises a network switch configured to communicate using a communication network, and sending the fault packet to the first node controller is further defined as sending, via the network switch using the communication network, the fault packet to the first node controller identified by the first packet forwarding information.

14. The optical network of claim 13, wherein the network switch is a first network switch, the communication network is a first communication network, the first node controller comprises a second network switch configured to communicate using the first communication network and a second communication network, and sending the fault packet to the tail-end node is further defined as sending, via the second network switch using the second communication network, the fault packet toward the tail-end node identified by the second packet forwarding information.

15. The optical network of claim 14, wherein the second node controller further comprises a third network switch configured to communicate using a third communication network, and sending the fault packet to the optical protection switching module is further defined as sending, via the third network switch using the third communication network, the fault packet to the optical protection switching module identified by the third packet forwarding information.

16. The optical network of claim 15, wherein the first communication network is a first virtual local area network, the second communication network is a second virtual local area network, and the third communication network is a third virtual local area network.

17. The optical network of claim 12, wherein the first node controller further comprises a third processor and a third non-transitory processor-readable medium storing third processor-executable instructions that when executed by the third processor cause the third processor to, prior to receiving the fault information:

configure the first packet forwarding circuitry so that the first table includes a key-value pair having the second packet forwarding information as a value and at least a portion of the first packet forwarding information as the first key.

18. The optical network of claim 17, wherein the key-value pair is a first key-value pair, the value is a first value, and the second node controller further comprises a fourth processor and a fourth non-transitory processor-readable medium storing fourth processor-executable instructions that when executed by the fourth processor cause the fourth processor to, prior to retrieving the third packet forwarding information:

send the second packet forwarding information to the head-end node; and configure the second packet forwarding circuitry so that the second table includes a second key-value pair having the third packet forwarding information as a second value and at least a portion of the second packet forwarding information as the second key.

19. The optical network of claim 12, wherein the first processor-executable instructions when executed by the first processor further cause the first processor to, prior to receiving the fault information, store the first packet forwarding information.

20. The optical network of claim 12, wherein the first packet forwarding circuitry is a first field-programmable gate array (FPGA), and the second packet forwarding circuitry is a second FPGA.

* * * * *